(12) United States Patent
Kumar et al.

(10) Patent No.: US 9,008,879 B2
(45) Date of Patent: Apr. 14, 2015

(54) SYSTEM AND METHOD FOR OPERATING A HYBRID VEHICLE SYSTEM

(71) Applicant: General Electric Company, Schenectady, NY (US)

(72) Inventors: Ajith Kuttannair Kumar, Erie, PA (US); Wolfgang Daum, Erie, OR (US); Dimitrios Ioannidis, Erie, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/927,161

(22) Filed: Jun. 26, 2013

(65) Prior Publication Data

US 2014/0012446 A1    Jan. 9, 2014

Related U.S. Application Data

(60) Provisional application No. 61/784,482, filed on Mar. 14, 2013, provisional application No. 61/668,432, filed on Jul. 5, 2012, provisional application No. 61/722,744, filed on Nov. 5, 2012.

(51) Int. Cl.
*B60L 9/00* (2006.01)
*B60W 20/00* (2006.01)
(Continued)

(52) U.S. Cl.
CPC ............ *B60W 20/00* (2013.01); *B60L 11/1809* (2013.01); *B60W 10/08* (2013.01);
(Continued)

(58) Field of Classification Search
CPC ...... B60L 9/00; B60L 11/1816; B60L 11/002
USPC .......................................................... 701/22
See application file for complete search history.

(56) References Cited

U.S. PATENT DOCUMENTS

2010/0275810 A1    11/2010    Barbee et al.
2011/0166736 A1*   7/2011    Kitanaka ..................... 701/22

FOREIGN PATENT DOCUMENTS

BE    671098 A    2/1966
EP    2051358 A1  4/2009
(Continued)

OTHER PUBLICATIONS

International Search Report and Written Opinion issued in connection with corresponding PCT Application No. PCT/US2013/048406 on Apr. 11, 2014.

*Primary Examiner* — James Trammell
*Assistant Examiner* — Michael D Lang
(74) *Attorney, Agent, or Firm* — GE Global Patent Operation; John A. Kramer

(57) ABSTRACT

System including a switch control module that is configured to control operation of a first contactor and a second contactor in a vehicle system. The first and second contactors are configured to selectively connect front-end and direct-current (DC) buses, respectively, to an energy storage system of the vehicle system. The front-end bus is configured to receive electrical power from an external power source and provide the electrical power to a converter device. The converter device is configured to supply DC power to the DC bus. The switch control module is configured to close the second contactor when the vehicle system is operably coupled to the external power source so that the energy storage system is charged by the DC power. The switch control module is configured to close one of the first contactor or the second contactor when the vehicle system is operably decoupled to the external power source.

26 Claims, 6 Drawing Sheets

(51) Int. Cl.
   *B60L 11/18* (2006.01)
   *B60W 10/08* (2006.01)
   *B60W 10/30* (2006.01)
   *B60L 3/00* (2006.01)
   *B60L 9/18* (2006.01)
   *B60L 9/24* (2006.01)
   *B60L 1/00* (2006.01)

(52) U.S. Cl.
   CPC ............ *B60W 10/30* (2013.01); *B60L 11/1801* (2013.01); *B60L 11/1855* (2013.01); *B60L 11/1866* (2013.01); *B60L 11/1868* (2013.01); *B60L 11/1877* (2013.01); *B60L 3/0023* (2013.01); *B60L 9/18* (2013.01); *B60L 9/24* (2013.01); *Y10S 903/93* (2013.01); *Y02T 10/7005* (2013.01); *B60L 1/00* (2013.01); *B60L 2240/547* (2013.01); *Y02T 10/7088* (2013.01); *Y02T 10/7066* (2013.01); *Y02T 10/7061* (2013.01); *Y02T 90/14* (2013.01); *B60L 2200/26* (2013.01)

(56) References Cited

FOREIGN PATENT DOCUMENTS

| | | |
|---|---|---|
| EP | 2340957 A1 | 7/2011 |
| GB | 1066657 A | 4/1967 |

\* cited by examiner ated herein
SYSTEM AND METHOD FOR OPERATING A HYBRID VEHICLE SYSTEM This application claims the benefit of U.S. Provisional Application Nos. 61/784,482 ("the '482 Application"), which was filed on 14 Mar. 2013, 61/668,432 ("the '432 Application"), which was filed on 5 Jul. 2012, and 61/722,744 ("the '744 Application"), which was filed on 5 Nov. 2012. Each of the '482, '432, and '744 Applications is incorporated herein by reference in its entirety.

BACKGROUND

Known vehicle systems (e.g., locomotives, automobiles, mining equipment, etc.) may include traction motors that provide tractive efforts to propel the vehicle systems. In some cases, the traction motors may be powered by more than one power source. For example, existing hybrid vehicles may be powered by diesel-driven generators and also by on-board energy storage systems (e.g., battery systems). In other cases, a hybrid vehicle system may be powered by the energy storage system and an external power source, such as overhead lines or third rail. The external power source, however, may not be accessible for the entire route. For example, the overhead lines or the third rail may extend along only a portion of the route. For a vehicle system to continue moving along the route when the external power source is not available, the vehicle system should be able to obtain power from another source.

A known locomotive includes a pantograph that couples to overhead lines. While connected to the overhead lines, electrical power is delivered through the pantograph and through, among other things, a direct current (DC) bus or link to the fraction motor(s). When the locomotive is no longer operably connected to the overhead lines, the locomotive includes an energy storage system that powers the traction motor. The electrical power may be delivered through the same DC bus. However, a number of intermediate electrical components may be coupled between the energy storage system and the traction motor. For instance, the energy storage system may be coupled to the DC bus using multiple components (e.g., filters, rectifiers, transformers, etc.). These multiple components may be configured to galvanically isolate the battery from the DC bus and to convert the voltage of the battery to a different voltage.

These additional intermediate components, however, can significantly increase the cost, maintenance needs, and weight of the vehicle system. With respect to weight, the addition of certain components (e.g., transformers) to a vehicle system may add hundreds of pounds or kilograms to the weight of the vehicle system. Such an addition of weight may not be possible for some vehicle systems (e.g., automobiles), and may be undesirable for other vehicle systems. With respect to locomotives, adding one or more transformers can significantly increase the weight of the locomotive and thereby require additional tractive effort to propel the locomotive. In addition, transformers can consume additional volume in the limited space of a vehicle system.

BRIEF DESCRIPTION

In one embodiment, a system is provided that includes a switch control module configured to control operation of a first contactor and a second contactor in a vehicle system. The first and second contactors are configured to selectively connect front-end and direct-current (DC) buses, respectively, to an energy storage system of the vehicle system. The front-end bus is configured to receive electrical power from an external power source and provide the electrical power to a converter device. The converter device is configured to supply DC power to the DC bus. The DC bus is configured to be coupled to a propulsion system of the vehicle system and configured to have a designated traction voltage for powering the propulsion system that is approximately equal to a charging voltage of the energy storage system. The switch control module is configured to close the second contactor when the vehicle system is operably coupled to the external power source. The converter device configured to provide the DC power to the DC bus so that the energy storage system is charged and the propulsion system receives the DC power. The switch control module is also configured to close one of the first contactor or the second contactor when the vehicle system is operably decoupled to the external power source. The energy storage system is configured to supply the electrical power to the propulsion system when the vehicle system is operably decoupled to the external power source.

In another embodiment, a power train of a vehicle system is provided that includes a converter device configured to receive electrical power from an external power source and front-end and direct-current (DC) buses electrically interconnected by the converter device. The converter device is configured to receive the electrical power from the external power source through the front-end bus and provide DC power to the DC bus. The power train may also include a propulsion system that is configured to provide tractive effort for moving the vehicle system. The propulsion system is operably connected to the DC bus and configured to receive the DC power from the DC bus. The power train may also include an energy storage system that is configured to be selectively connected to the front-end and DC buses through first and second contactors, respectively. The power train may also include a switch control module that is configured to control operation of the first and second contactors. The switch control module is configured to close the second contactor when the power train is operably coupled to the external power source such that the energy storage system is charged and the propulsion system receives the DC power. The switch control module is also configured to close one of the first contactor or the second contactor when the power train is operably decoupled to the external power source. The energy storage system is configured to supply the electrical power to the propulsion system when the vehicle system is operably decoupled to the external power source.

In another embodiment, a power train of a vehicle system is provided that includes a converter device configured to receive electrical power from an external power source and supply direct current (DC) power to a DC bus of the vehicle system. The power train may also include a propulsion system that has a fraction motor for moving the vehicle system. The propulsion system is configured to receive the DC power through the DC bus. The power train also includes an energy storage system operably connected to the DC bus, wherein the energy storage system has a designated charging voltage and is configured to operate in a charging mode and in a supply mode. The vehicle system is operably connected to the external power source in the charging mode, and the vehicle system is not operably connected to the external power source in the supply mode. The designated charging voltage is approximately equal to a voltage requirement of the traction motor at a determined torque such that the energy storage system can be charged through the DC bus during the charging mode. The propulsion system can be supplied power through the DC bus from the energy storage system during the supply mode without a voltage converter being disposed between an output of the energy storage system and an input of the propulsion system.

In another embodiment, a method of powering a vehicle system that is configured to receive electrical power from an external power source and that includes an energy storage system is provided. The method includes supplying the electrical power to a converter device through a front-end bus when the vehicle system is operably connected to the external power source. The converter device is configured to convert the electrical power to DC power and supply the DC power to a DC bus. The method also includes charging an energy storage system that is selectively connected to the DC bus when the vehicle system is operably connected to the external power source while simultaneously powering a propulsion system connected to the DC bus. The method also includes determining that the vehicle system is operably decoupled to the external power source. The method also includes supplying electrical power from the energy storage system to one of the front-end bus or the DC bus to power the propulsion system when the vehicle system is operably decoupled to the external power source.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
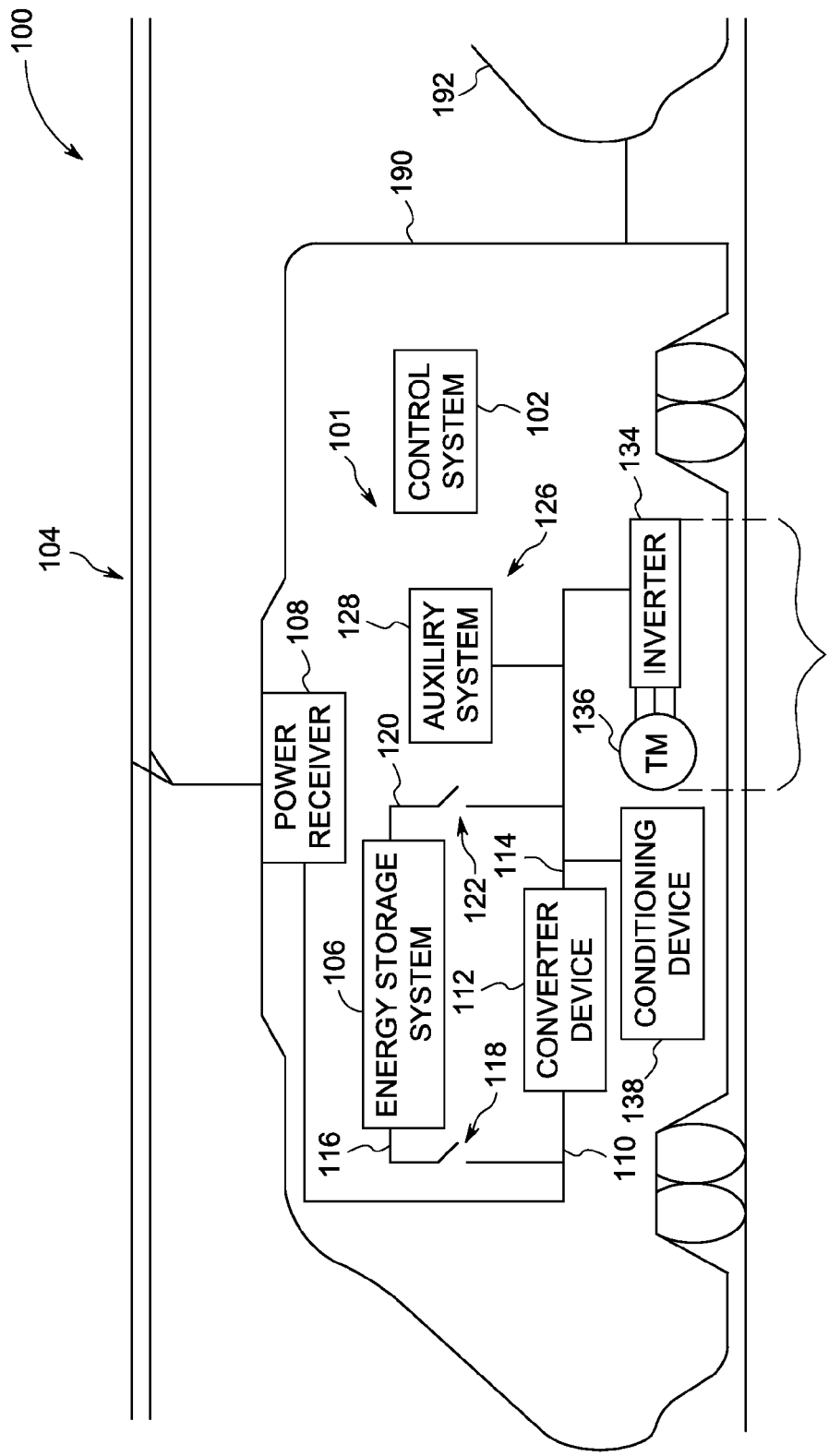
FIG. 1 is a schematic diagram of a vehicle system formed in accordance with one embodiment.

One or more embodiments of the inventive subject matter described herein provide systems and methods for powering a vehicle system with different types of power sources (e.g., a hybrid vehicle system). For various embodiments, at least one of the power sources is an energy storage system that is carried by the vehicle system. In particular embodiments, the vehicle system is capable of being powered by an external power source (e.g., catenary or overhead lines, third rail, and the like). The vehicle system may travel along a designated route that includes, for at least some portions of the route, the external power source extending therealong. The vehicle system may be operably coupled to the external power source for a first portion of the route such that the external power source supplies electrical power to the vehicle system. During a second portion of the route, however, the vehicle system may not be operably connected to the external power source. A vehicle system may not be operably connected to the external power source if, for example, the vehicle system is not operably coupled (e.g., operably decoupled) to the external power source, the external power source is not providing enough electrical power or any electrical power, or a component in the vehicle system has failed such that electrical power cannot be received from the external power source.

Although at least some of the embodiments described herein are described in relation to an external power source, alternative embodiments may include a prime mover (e.g., diesel engine) along with an energy storage system. In such embodiments, the prime mover may simultaneously charge the energy storage system and power a propulsion system during operation.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system," "module," or "controller" may include hardware and/or software that operate(s) to perform one or more functions. For example, a system, module, or controller may include a computer processor or other logic-based device that performs operations based on instructions stored on a tangible and non-transitory computer readable storage medium, such as a computer memory. Alternatively, a system, module, or controller may include a hard-wired device that performs operations based on hard-wired logic of the device. The systems, modules, and controllers shown in the Figures may represent the hardware that operates based on software or hardwired instructions, the software that directs hardware to perform the operations, or a combination thereof.

As used herein, terms such as "operably connected," "operatively connected," "operably coupled," "operatively coupled" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

FIG. 1 is a schematic view of a vehicle system 100 including a power train or assembly 101. The power train 101 may include a control system (or system controller) 102 that controls directly or indirectly various components of the vehicle system 100 so that the vehicle system 100 may at least one of receive, generate, store, or supply power for moving the vehicle system 100. As shown, the vehicle system 100 may obtain electrical power through an external power source 104, such as a catenary system (e.g., overhead line), third rail, etc.

The power train 101 may also include an energy storage system 106 for moving the vehicle system 100. The energy storage system 106 may have, for example, one or more batteries, capacitors, fuel cells, etc. Batteries may include one or more of a sodium metal halide battery, a sodium sulfur battery, a lithium-based battery, a nickel metal hydride battery, a nickel cadmium battery, or a lead acid battery. The batteries can be used alone or in combinations as appropriate based on the system needs. The electrical power received from the external power source 104 may be used to move the vehicle system 100 and/or charge the energy storage system 106.

The energy storage system 106 may be located onboard the vehicle system 100 such that the energy storage system 106 is carried by the vehicle system 100 as the vehicle system 100 travels. In the illustrated embodiment, the energy storage system 106 is located on a first vehicle or body 190 of the vehicle system 100. However, the energy storage system 106 may be onboard another vehicle of the vehicle system 100. For example, if the vehicle system 100 includes a locomotive (or other linked vehicle), the energy storage system 106 may include a tender car that is connected to the locomotive through mechanical and electrical couplings.

In some embodiments, the energy storage system 106 may include a plurality of module subassemblies in which each module subassembly has individual storage units (e.g., batteries), a battery management system (or sub-system) or portion thereof, and an optional reference ground. In one embodiment, a module subassembly may include two sets in which each set has four-five storage units in series. If each storage unit is a 20 kWh battery with about 550V output, a total of 160 kWh (or 200 kWh) can be obtained with a total of 1100V. This configuration may accommodate instances in which the individual storage units require a reference ground and the module subassembly does not have such restrictions. Other configurations may be available in which isolation is obtained by case isolation, use of secondary enclosures, and the like.

During operation, the vehicle system 100 may be operably coupled to the external power source 104 for at least a portion of a route taken by the vehicle system 100. When the vehicle system 100 is not operably connected to the external power source 104, the electrical power for driving the vehicle system 100 may be provided by the energy storage system 106. However, the energy storage system 106 and the external power source 104 are not required to be operated exclusively and, in some embodiments, the electrical power for operating the vehicle system 100 may be simultaneously or concurrently provided by the energy storage system 106 and the external power source 104. In particular embodiments, the vehicle system 100 may be an all-electric hybrid vehicle system in which the electrical power for moving the vehicle system 100 is provided by the external power source 104 and the energy storage system 106. In alternative embodiments, however, the vehicle system 100 may include a different power source, such as a prime mover (e.g., diesel engine), that may be used to generate electrical power.

For some embodiments, the vehicle system 100 may be a locomotive. In other embodiments, however, the vehicle system 100 may be another vehicle system capable of self-propulsion (e.g., vehicle systems that include motors for providing tractive efforts). Such vehicle systems may include automobiles, rail vehicles other than locomotives, other off-highway vehicle systems (e.g., mining or other vehicle systems that are not designed and/or permitted to travel on public roads), trucks, marine vessels, or industrial equipment.

In some embodiments, the vehicle system 100 includes a single vehicle consist or includes a plurality of vehicles consists. As used herein, a "vehicle consist" includes a group of individual vehicles that are mechanically coupled or linked together to travel along a route. The individual vehicles may include powered units and non-powered units. In some cases, a vehicle consist includes a plurality of powered units (e.g., a plurality of locomotives) that are directly or indirectly coupled to one another. The plurality of powered units in a single vehicle consist may be configured to operate as a single moving apparatus. For example, the multiple powered units may be controlled by a master computing system that coordinates tractive and/or braking efforts to control operation of the vehicle system that includes the vehicle consist. For such embodiments that include multiple vehicle consists, each vehicle consist may coordinate operations with other vehicle consists to move the vehicle system 100 as a single moving apparatus.

In some embodiments, the vehicle system 100 is characterized as having a distributed power train or being capable of operating in different modes. In a distributed power train, different powered units (or different vehicle consists) are capable of operating according to different instructions. For example, a single vehicle system may include first and second powered units (or first and second vehicle consists). A master computing system for the vehicle system may instruct the first and second powered units in a manner that coordinates tractive and/or braking efforts of the vehicle system. However, the master computing system may communicate different instructions to them. For example, the first powered unit may be instructed to operate at a high notch (or throttle) setting. At the same time, the second powered unit may be instructed to operate at a lower notch setting or to apply brakes to the powered unit.

As shown in FIG. 1, the power train 101 may include a power receiver 108 that is configured to engage the external power source 104 and receive the electrical power therefrom. The power receiver 108 may then supply the electrical power directly or indirectly to a front-end bus 110 of the power train 101. The power receiver 108 may include suitable equipment (e.g., switch gear, lightning arrestor (e.g., a varistor), sensors, and the like) for engaging and disengaging the external power source 104. The front-end bus 110 is operably connected to a converter device 112 and the energy storage system 106 of the power train 101. In some embodiment in which the external power source 104 supplies the front-end bus 110 with alternating-current (AC) power, the front-end bus 110 may be referred to as an AC bus. Although not shown, the front-end bus 110 may be operably coupled to components other than the converter device 112 and the energy storage system 106.

The converter device 112 may be configured to transform or modify the electrical power in a designated manner and provide the modified electrical power to a DC bus 114 of the power train 101. In the illustrated embodiment, the DC bus 114 is directly connected to the converter device 112. By way of one example, in embodiments where the front-end bus 110 is supplied with AC power, the converter device 112 may operate as a rectifier that converts the AC power to direct-current (DC) power and supplies the DC power to the DC bus 114. As another example, the converter device 112 may operate as a DC-DC converter or chopper that increases (e.g., steps-up) or decreases (e.g., steps-down) a voltage of the DC power that is supplied to the converter device 112 from the front-end bus 110. In this instance, the DC power may be provided by the external power source 104 or the energy storage system 106.

The converter device 112 may be a bi-directional converter that has a plurality of different functions during the same trip or mission of the vehicle system 100. For example, the converter device 112 may (a) convert AC power from the front-end bus 110 to DC power when the vehicle system 100 is operably connected to the external power source 104; (b) change a voltage of the DC power that is received from the energy storage system 106 to a different voltage; or (c) change a voltage of DC power that is received from an inverter 134 of a propulsion system 124. In embodiments where the external power source 104 provides DC power, the converter device 112 may likewise change a voltage of the DC power.

As shown in FIG. 1, the energy storage system 106 may be operably connected to the front-end bus 110 and to the DC bus 114. The power train 101 may include a conductive pathway 116 that connects the front-end bus 110 and the energy storage system 106. The conductive pathway 116 may have a first contactor 118 that is configured to close or open and thereby control an amount of electrical power supplied by the energy storage system 106. The power train 101 may also include a conductive pathway 120 that connects the DC bus 114 to the energy storage system 106. The conductive pathway 120 may have a second contactor 122 that is configured to close or open and thereby control an amount of electrical power supplied to or from the energy storage system 106. The first and second contactors 118, 122 may also be characterized as switches or relays.

The DC bus 114 may also be operably connected to a conditioning device 130, the propulsion system 124, and one or more additional sub-systems 126. In the illustrated embodiment, the propulsion system 124 includes the inverter 134 and a traction motor 136. The propulsion system 124 is configured to provide tractive efforts for moving the vehicle system 100. The sub-systems 126 may include, for example, an auxiliary system 128. Although not shown, additional devices or sub-systems may be operably coupled to the front-end bus 110 or the DC bus 114.

The auxiliary system 128 may be operably coupled to one or more non-tractive components and be configured to change the DC power so that the DC power is suitable for powering the non-tractive components. For example, the auxiliary system 128 may supply electrical power to compressors, fans or blowers, on-board air conditioners, radiators, user interfaces, brakes, and the like. The auxiliary system 128 may include a converter device that reduces (e.g., chops) the voltage of the electrical power in the DC bus 114.

The conditioning device 130 may be configured to modify the electrical power. For example, the conditioning device 130 may include one or more components that filter out unwanted frequencies and/or regulate the current of the DC bus 114 or the like. The conditioning device 130 may also regulate the voltage of the DC bus 114 (e.g., by removing transient voltages). The conditioning device 130 may include, for example, a second harmonic filter.

The control system 102 may instruct the various components of the power train 101 to perform designated operations for at least one of receiving, generating, storing, distributing, or supplying the electrical power for operating the vehicle system 100. The control system 102 may be connected, directly or indirectly, to one or more of the power receiver 108, the converter device 112, the energy storage system 106, the propulsion system 124, the auxiliary system 128, and the conditioning device 130. Although FIG. 1 appears to indicate that the control system 102 is a single structure, the control system 102 may include a plurality of modules and/or components that are distributed throughout the vehicle system 100 at separate locations.

The control system 102 may be configured to operate one or more components of the vehicle system 100 during different operating modes. In particular, the control system 102 may selectively control the first and second contactors 118 and 122 to control storage and distribution of the electrical power. For example, the vehicle system 100 may selectively operate the first and second contactors 118, 122 in different manners for: (i) an external-supply mode in which the vehicle system 100 is operably coupled to the external power source 104; (ii) an internal-supply mode in which the vehicle system 100 is not operably coupled (e.g., operably decoupled) to the external power source 104 and electrical power is supplied by the energy storage system 106; and (iii) a regeneration mode in which the vehicle system 100 is recapturing power through dynamic braking. The regeneration mode may occur when the vehicle system 100 is operably coupled or operably decoupled to the external power source 104.

During the external-supply mode, the first contactor 118 may be open and the second contactor 122 may be closed. The DC power provided by the converter device 112 may simultaneously power the propulsion system 124 and charge the energy storage system 106. The voltage of the DC power may be configured to be approximately equal to a charging voltage of the energy storage system 106. During the internal-supply mode, the first contactor 118 may be closed and the second contactor 122 may be open. The electrical power may be provided to the front-end bus 110 and the converter device 112 by the energy storage system 106. As such, electrical power from the energy storage system 106 (e.g., DC power) may be supplied to the front-end bus 110 and the converter device 112, which previously transmitted electrical power from the external power source 104. Optionally, the converter device 112 may modify the electrical power in a designated manner so that the electrical power is sufficient for operating the vehicle system 100. For instance, the converter device 112 may increase (step-up) or decrease (step-down) a voltage of the DC power based on the power requirements of the propulsion system 124 and the other sub-systems 126. Alternatively, the electrical power may bypass the converter device 112 such that the DC power is not changed or modified.

In some embodiments, during the internal-supply mode, the first contactor 118 may be open and the second contactor 122 may be closed. As such, electrical power may be directly supplied to the DC bus 114 without being modified (e.g., chopped) by the converter device 112. As such, the electrical power may remain in an uncoverted state between an output of the energy storage system 106 and an input of the propulsion system 126 when the electrical power is supplied through the second contactor 122. In particular embodiments, the electrical power may remain in an untransformed state between an output of the energy storage system 106 and an input of the propulsion system 126 when the electrical power is supplied through the second contactor 122. More specifically, a transformer may not separate and galvanically isolate the energy storage system 106 from the DC bus 114.

Accordingly, the electrical power may be directly supplied to the DC bus 114 when a discharging voltage of the energy storage system 106 is approximately equal to a required traction voltage of the propulsion system 134. As will be described below, in some embodiments, the energy storage system 106 may be adaptable or reconfigurable to change the discharging voltage of the energy storage system 106 so that the energy storage system 106 can supply electrical power having a range of voltages directly to the DC bus 114.

Figure 2:
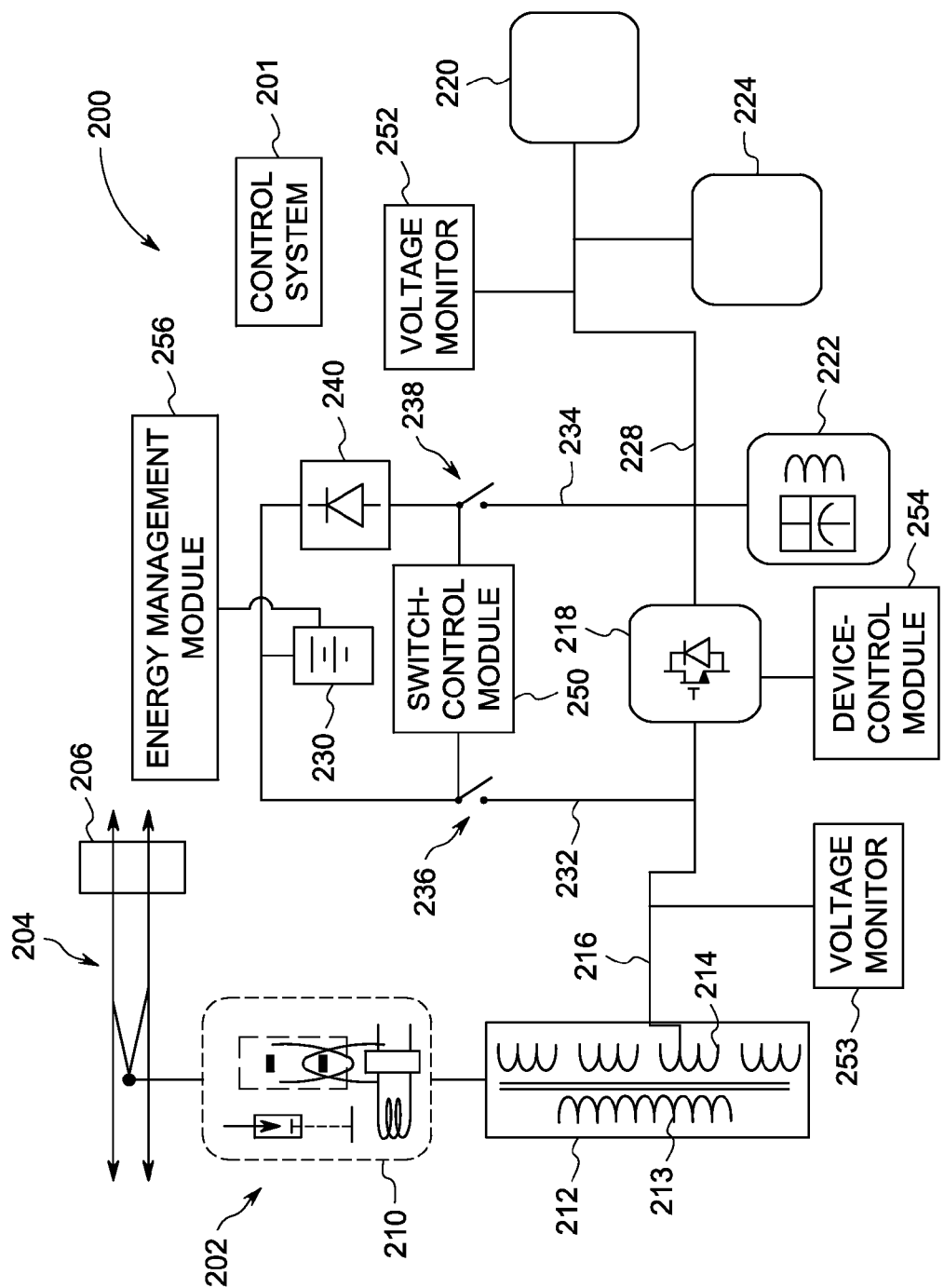
FIG. 2 is a schematic diagram of a power train or assembly formed in accordance with one embodiment.

FIG. 2 is a schematic diagram of a power train or assembly 200 formed in accordance with one embodiment. The power train 200 may be part of a vehicle or vehicle system, such as the vehicle system 100 (FIG. 1). As shown, the power train 200 may include a power receiver 202, which in the illustrated embodiment is a catenary package configured to engage overhead lines 204 of an external power source 206. In some embodiments, the vehicle system is a locomotive (or locomotive consist) that removably engages the overhead lines 204 along a route, such as railroad tracks. The electrical power supplied by the external power source 206 is single-phase AC power, but the electrical power may be multi-phase AC power or DC power in other embodiments. In FIG. 2, the power receiver 202 may include a source-connecting package 210, which may have, for example, switch gear, a lightning arrestor (e.g., a varistor), sensing equipment, and the like.

In the illustrated embodiment, the power receiver 202 is configured to receive and deliver electrical power having a high voltage (e.g., greater than 5 kV) to a first or main transformer 212. By way of example, the electrical power may be about 15 kV at about 16.7 Hz or about 25 kV at about 50 Hz, but other amounts and frequencies of electrical power may be used in other embodiments. The main transformer 212 may also be referred to as an inductor (or coil or reactor) and may include an iron core and one or more inductors (e.g., windings). The main transformer 212 may be configured to transform an input voltage from the power receiver 202 to an output voltage. A difference between the input and output voltages may be determined by a ratio of input windings to output windings. For example, the main transformer 212 may include a single input winding 213 and one or more secondary windings 214. In the illustrated embodiment, a single secondary winding 214 may be operably coupled to and configured to provide a sufficient amount of power for the remaining elements of the power train 200. Although not shown, the other secondary windings 214 may be operably coupled to other power trains 200 and/or components of the vehicle system. In some embodiments, the vehicle system is configured to operate at about 4-9 MW with each of the power trains 200 operating between about 1-2 MW.

The main transformer 212 is connected to a first or front-end bus 216 that is electrically connected to a converter device 218. As described above with respect to the converter device 112 (FIG. 1), the converter device 218 may have multiple functions in the illustrated embodiment. For example, under some circumstances, the converter device 218 may operate as a rectifier, a DC-DC converter, or may allow electrical power to bypass the converter device 218. One example of a suitable converter device 218 includes a pulse width modulation (PWM) rectifier. In some embodiments, an average voltage (or current) that is received by the converter device 218 may be controlled by closing and opening a switch or contactor (not shown) of the converter device 218 in a designated manner (e.g., at a designated frequency). In such instances, the greater amount of time that the switch or contactor is closed, a greater amount of electrical power may be supplied through the converter device 218. Alternatively or in addition to, the converter device 218 may include one or more metal-oxide-semiconductor field-effect transistors (MOSFETs) or insulated-gate bipolar transistors (IGBTs). In some embodiments, the converter device 218 may include one or more inductors and/or one or more capacitors to filter switching noise.

The converter device 218 is electrically connected to a DC bus 228 and configured to supply DC power thereto. The DC bus 228, in turn, is electrically connected to a propulsion system 220, a conditioning device 222, and an auxiliary system 224, which may be similar to the propulsion system 124, the conditioning device 138, and the auxiliary system 128 in FIG. 1. Although not shown, the propulsion system 220 may include one or more inverters and one or more traction motors that receive electrical power from the inverters. The auxiliary system 224 may be electrically connected to other sub-systems of the vehicle system. The propulsion system 220 and the auxiliary system 224 are configured to draw power from the DC bus 228 and, in some instances, may generate and supply power to the DC bus 228. With respect to the conditioning device 222, the conditioning device 222 may include, for example, an inductive capacitor module and/or a harmonic filter.

The power train 200 may also include an energy storage system 230. The energy storage system 230 is configured to supply the power train 200 and, more specifically, the propulsion system 220, with electrical power for moving the vehicle system. The energy storage system 230 may include a plurality of individual storage units, such as one or more batteries, capacitors, fuel cells, that are arranged in parallel and/or series. The types of storage units and the arrangement of storage units may be configured such that the energy storage system 230 has a charging voltage.

When the vehicle system is operably coupled to the external power source 206, the main transformer 212 and the converter device 218 may be configured to supply a designated voltage at the DC bus 228 for charging the energy storage system 230 and for powering the propulsion system 220. In some embodiments, the designated voltage at the DC bus 228 is varying, but, in other embodiments, the designated voltage at the DC bus 228 may be substantially constant. The voltage at the DC bus 228 may be approximately equal to the charging voltage of the energy storage system 230. By way of example only, the DC bus 228 may operate at about 1-3.5 kV or, more particularly, about 2.8 kV.

In the illustrated embodiment, the energy storage system 230 is electrically connected to the front-end bus 216 and also to the DC bus 228. The energy storage system 230 may be electrically connected to the front-end bus 216 through a line or conductive pathway 232 and may be electrically connected to the DC bus 228 through a line or conductive pathway 234. The conductive pathways 232, 234 include first and second contactors 236, 238. Optionally, the conductive pathway 234 may include a diode 240. The first and second contactors 236, 238 are configured to selectively connect the front-end and direct-current (DC) buses 216, 228, respectively, to the energy storage system 230. During operation of the power train 200, the first and second contactors 236, 238 are configured to close or open to control the flow of electrical power through the power train 200 as described herein.

The various components of the power train 200 may be operably coupled to a control system 201, which may be similar to the control system 102 (FIG. 1). The control system 201 may include a combination of hardware and/or software components that are configured to execute designated operations of the power train 200. For example, the designated operations may control at least one of receiving, generating, storing, distributing, or supplying the electrical power for the power train 200. As shown in FIG. 2, the control system 201 may include a plurality of modules and monitors (or detectors). Although the modules and monitors are illustrated as having certain locations relative to other components of the power train 200 in FIG. 2, it is understood that the modules and monitors may have different locations in other embodiments.

The control system 201 may include a switch control module 250 that is configured to control operation of the first contactor 236 and the second contactor 238. The switch control module 250 may control operation of the first and second contactors 236, 238 based on data (e.g., measurements) from other components of the vehicle system. For example, the control system 201 may also include voltage monitors 252, 253. The voltage monitor 252 is configured to determine a voltage parameter (e.g., voltage or current) of the DC bus 228, and the voltage monitor 253 is configured to determine a voltage parameter of the front-end bus 216. Based on measurements received from the voltage monitors 252, 253, the switch control module 250 may be configured to open or close the first and second contactors 236, 238. For example, the switch control module 250 may close the second contactor 238 when it is determined that the power train 200 is operably coupled to the external power source 206. The switch control module 250 may also be configured to close one of the first contactor 236 or the second contactor 238 when it is determined that the vehicle system is operably decoupled to the external power source 206.

The control system 201 may also include a device-control module 254 that is configured to control operation of the converter device 218, and an energy management module 256 that is configured to control operation of the energy storage system 230. Operation of the device-control module 254 and the energy management module 256 may also be based on data received from other components of the vehicle system. As one example, the device-control module 254 may be configured to control the converter device 218 to increase or decrease a voltage of the electrical power supplied by the energy storage system 230 (or the transformer 212) to achieve a designated voltage for the DC power.

As described above with respect to the vehicle system 100 (FIG. 1), the power train 200 may operate according to different operating modes. For example, the power train 200 may operate according to an external-supply mode in which the power receiver 202 is operably connected to the external power source 206. During the external-supply mode, electrical power from the external power source 206 may be received by the power receiver 202 and supplied to the main transformer 212. The main transformer 212 may direct the electrical power to the front-end bus 216 through one of the secondary windings 214. In the external-supply mode, the electrical power from the front-end bus 216 may be modified by the converter device 218. For example, the converter device 218 may operate as a rectifier that converts the electrical power in the front-end bus 216 from AC power to DC power. In alternative embodiments in which the power receiver 202 receives DC power, the converter device 218 may be a DC-DC converter (e.g., chopper) that steps up or steps down the voltage of the DC power. In some embodiments, the converter device 218 may also permit the DC power to bypass the converter device 218 and flow directly into the DC bus 228.

During the external-supply mode, the DC bus 228 may power the propulsion system 220 and/or the auxiliary system 224. The inverter (not shown) of the propulsion system 220 may convert the DC power to AC power and/or chop the AC power to a different voltage level. In some embodiments, the AC power that is supplied to the fraction motor(s) (not shown) is three-phase AC power.

The energy storage system 230 may also receive DC power from the DC bus 228 in the external-supply mode. More specifically, the second contactor 238 may be closed to allow the electrical power to be directed through the conductive pathway 234 and through the diode 240 to the energy battery system 230. As described herein, a traction voltage of the DC power provided by the converter device 218 may be approximately equal to a designated charging voltage of the energy storage system 230. Accordingly, in the external-supply mode, the propulsion system 220 may be powered while simultaneously charging the energy storage system 230. In some embodiments, the switch-control module 250 may be configured to selectively open the second contactor 238 during the external-supply mode such that the propulsion system 220 and/or the auxiliary system 224 are only powered and the energy storage system 230 is not charged. This may occur, for example, when the control system 201 determines that the energy storage system 230 is sufficiently charged or that the propulsion system 220 requires maximum power.

At some point during operation of the vehicle system, the power train 200 may no longer receive electrical power from the external power source 206. For instance, the overhead lines 204 may end (e.g., the overhead lines 204 may not extend along one or more portions of the route), the external power source 206 may fail to provide a sufficient amount of electrical power, or a component in the power train 200 may fail. The voltage monitor 253 may detect a change in voltage when the power train 200 is no longer receiving electrical power, and the control system 201 may then determine that the power train 200 is not operably connected to the external power source 206. For example, in some embodiments, the control system 201 may receive a measurement of the voltage parameter at the front-end bus 216 from the voltage monitor 253 and determine that the power train 200 is no longer receiving electrical power.

In other embodiments, instead of detecting a voltage parameter at the front-end bus 216, the voltage monitor 253 may be configured to detect a voltage parameter at the main transformer 212, at the power receiver 202, at a conductive pathway that extends between the main transformer 212 and the power receiver 202, or at another point within the power train 200. In alternative embodiments, the control system 201 may use other data to determine that the vehicle system is no longer operably connected to the external power source 206. For example, a sensor or detector may communicate data that informs the control system 201 that the power receiver 202 is no longer coupled to the overhead lines 204.

When the control system 201 determines that the power train 200 is not operably connected to the external power source 206, the switch-control module 250 may operate according to an internal-supply (or off-line) mode. When transitioning to the internal-supply mode, the switch-control module 250 may close one of the first and second contactors 236, 238 and open the other of the first and second contactors 236, 238.

In one embodiment, the switch-control module 250 may open the second contactor 238 and close the first contactor 236. With the first contactor 236 closed, the energy storage system 230 may supply DC power to the front-end bus 216 and, consequently, the converter device 218. At this time, the converter device 218 may also function as a chopper (e.g., DC-DC converter) that steps up or steps down the voltage of the DC power provided by the battery storage system 230 to the converter device 218. More specifically, the device control module 254 may operate the converter device 218 to provide a designated voltage of electrical power to the DC bus 228. The designated voltage may be based on, for example, a power requirement (e.g., notch or throttle level) provided by an operator of the vehicle system or the control system 201. As an example, the designated voltage may be between about 1-3.5 kV.

Under some circumstances, the battery storage system 230 may also provide electrical power directly to the DC bus 228 without directing the electrical power through a converter device (e.g., the converter device 218). For instance, in embodiments where the diode 240 is not used and the battery storage system 230 is capable of discharging electrical power at a designated operating voltage of the DC bus 228, the second contactor 238 may be closed to allow DC power to flow from the energy storage system 230 to the DC bus 228.

The battery storage system 230 may also be charged, in some embodiments, during a regeneration mode. The propulsion system 220 may be used to generate electrical power and charge the DC bus 228 during a dynamic braking operation. For example, the traction motor may operate as a generator when the vehicle system is executing a braking operation. As such, the propulsion system 220 may supply the DC bus 228 with DC power. On such occasions, the switch-control module 250 may operate the first and second contactors 236, 238 and/or the device-control module 254 may operate the converter device 218 in accordance with a regeneration mode. The power train 200 may or may not be operably coupled to the external power source 206 in the regeneration mode.

For example, in the regeneration mode, the switch-control module 250 may selectively activate the first and second contactors 236, 238 based on a voltage level of the DC bus 228. The voltage monitor 252 may determine that the DC bus 228 during the regeneration mode has an operating voltage that is approximately equal to the charging voltage of the energy storage system 230. As such, the switch-control module 250 may open the first contactor 236 and close the second contactor 238 so that the DC power in the DC bus 228 flows through the line 234 to the energy storage system 230.

The voltage monitor 252 may determine, however, that the DC bus 228 has an operating voltage during the regeneration mode that is not approximately equal to the charging voltage of the energy storage system 230. In such cases, the switch-control module 250 may open the second contactor 238 and close the first contactor 236 so that the DC power flows to the converter device 218. The device-control module 254, in turn, may control the converter device 218 to step-up or step-down the voltage of the DC power generated by the propulsion system 220 so that the voltage at the front-end bus 216 is at the charging voltage of the energy storage system 230.

Accordingly, in some embodiments, the power train 200 does not include a voltage converter between an output of the energy storage system 230 and an input of the propulsion system 220 when the electrical power is supplied through the second contactor 238. Unlike known vehicle systems, the power train 200 may not include a transformer between the output of the energy storage system 230 and the input of the propulsion system 220. In some embodiments, the electrical power that flows from an output of the energy storage system 230 to an input of the propulsion system 220 is only converted by the converter device 218 when the electrical power is supplied through the first contactor 238.

In some embodiments, the inductance inherently held (e.g., leakage inductance) by components in the power train 200 may be used to supply electrical power to the DC bus 228. For example, the transformer 212 may have an inductance and may be used as a short-time energy storage device. The transformer 212 may supply electrical power to the converter device 218, which can step-up or step-down the voltage and supply it to the DC bus 228. Alternatively, the transformer 212 can supply electrical power directly to the energy storage system 230 through the pathway 234. Switching devices may be used such that the transformer 212 effectively operates as a chopper device. As one specific example, suppose the power train 200 is operating at a designated speed (e.g., low speed). If the voltage of the DC bus 228 no longer matches the voltage of the energy storage system 230, the transformer 212 may be used to raise the voltage of the DC bus 228 or of the energy storage system 230. Although the above example specifically describes the transformer 212 as being used as an energy storage device, other electrical components in the power train 200 may be used in a similar manner.

Figure 3:
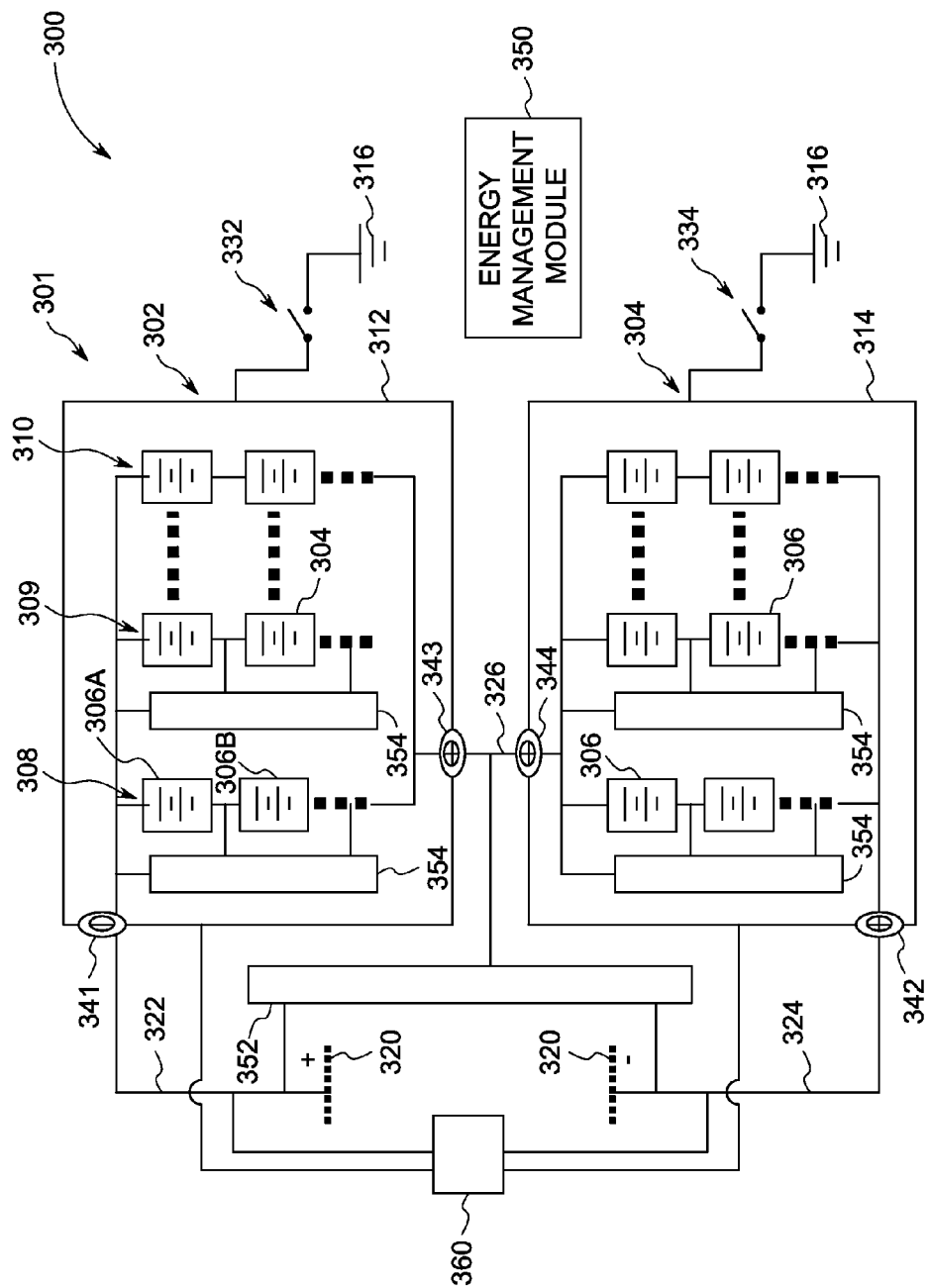
FIG. 3 is a schematic diagram of an energy storage system formed in accordance with one embodiment that may be used with a power train.

FIG. 3 is a schematic diagram of an energy storage system 300 in accordance with one embodiment that may be used with a power train, such as the power trains 200, 300 of FIGS. 2 and 3, respectively. However, the energy storage system 300 is not limited to only applications with the power trains 200, 300 but may be used with other power trains and vehicle systems. The energy storage system 300 may include a storage assembly 301 and an energy management module or controller 350. The storage assembly 301 may include one or more energy modules, such as the energy modules 302, 304, that each include one or more storage units (e.g., batteries, capacitors, fuel cells, and the like). In one or more embodiments, the energy storage system 300 is configured to provide an adaptable or reconfigurable charging voltage for charging the storage units 306 and/or an adaptable or reconfigurable operating voltage for supplying electrical power to a DC bus 320 that is electrically coupled to a propulsion system (not shown). For example, the power train 400 (shown in FIG. 4) may utilize the reconfigurable features of the energy storage system 300.

Figure 4:
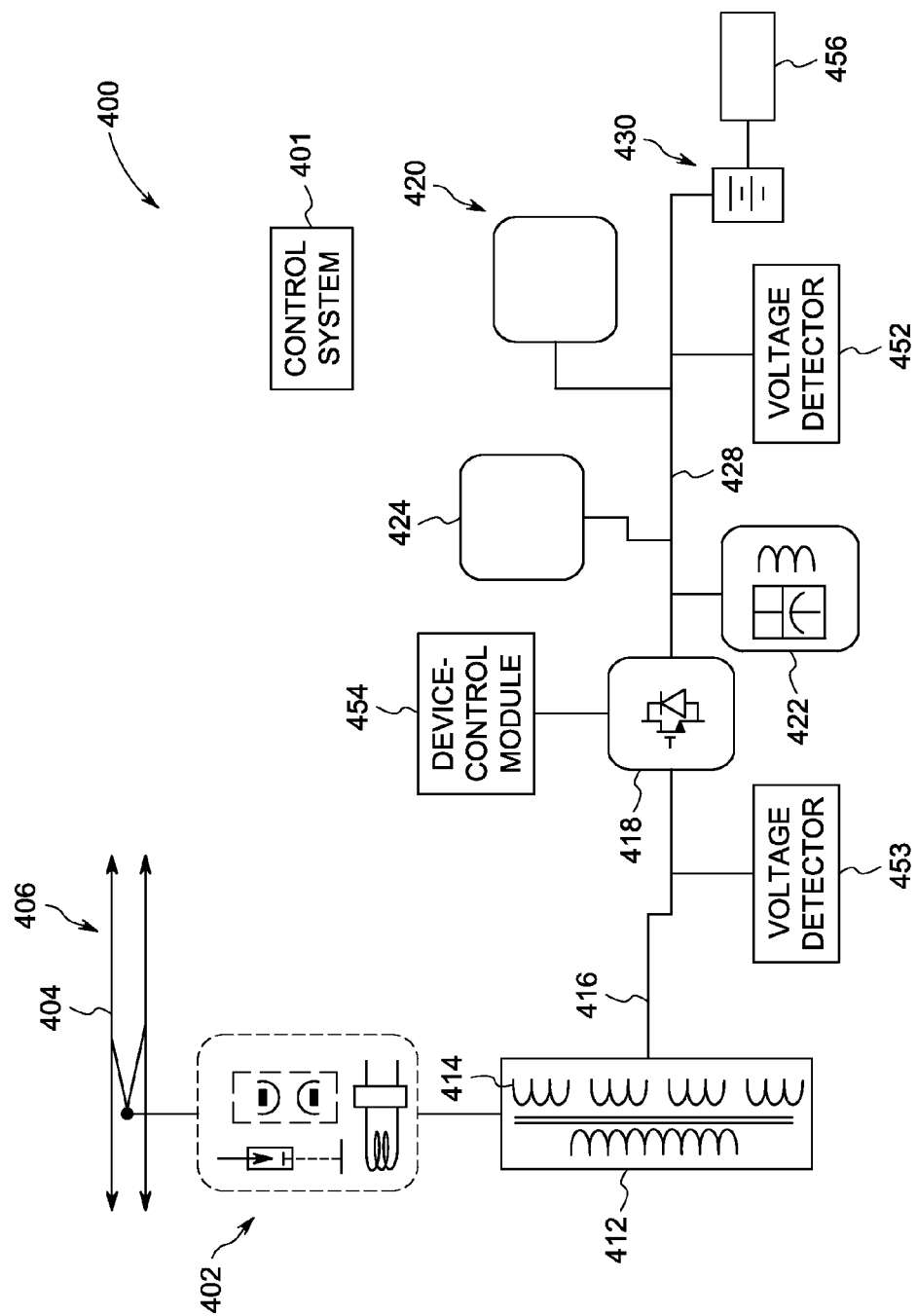
FIG. 4 is a schematic diagram of a power train or assembly formed in accordance with one embodiment.

As shown, the storage assembly 301 includes a plurality of energy modules (also referred to as energy banks) 302, 304 that are electrically connected to each other in series through a bank-to-bank bus 326. Additional energy modules may be coupled to each other in series and/or parallel in other embodiments. For example, the storage assembly 301 may include three to six energy modules in series. The energy storage system 300 is electrically coupled to the DC bus 320, which may be similar to the DC buses 216, 416 (FIGS. 2 and 4, respectively). The energy module 302 may be directly connected to a positive polarity conductor of the DC bus 320 through a first lead 322, and the energy module 304 may be directly connected to a negative polarity conductor of the DC bus 320 through a second lead 324.

Each of the energy modules 302, 304 may include an array of energy storage units (or cells) 306 that are electrically connected to each other in series and/or parallel. For example, with respect to the energy module 302, multiple rows or strings 308-310 of storage units 306 may include a plurality of storage units 306 in series. Although only three rows 308-310 are shown, the energy modules 302, 304 may include additional rows. Each of the rows 308-310 may be electrically connected to one another in parallel. As one example only, each of the rows 308-310 may have about 150 storage units arranged in series.

The energy modules 302, 304 may be configured to achieve a designated voltage and, in particular embodiments, a select voltage within a range of voltages. For instance, each of the energy modules 302, 304 may have a maximum voltage of about 550 to about 585V. The energy modules 302, 304 may also be configured to provide a designated amount of power and, in particular embodiments, a select amount of power within a range of power. For instance, the energy storage system 300 may be configured to provide from about 2 MW to about 6 MW of power.

To achieve a select voltage within a range of voltages, the energy storage system 300 may include a plurality of bypass circuits 352, 354. The bypass circuits 352, 354 may be controlled by the energy management module 350 to selectively charge or discharge one or more of the energy modules 302, 304 and/or one or more of the corresponding storage units 306. For example, individual storage units 306 may have different capacities than other storage units 306 due to, for instance, manufacturing tolerances, aging, and environmental conditions. As such, after several charge and discharge cycles, the storage units 306 may become imbalanced (or unequal) with respect to each other. These imbalances can reduce the lifetime operation and/or performance of a storage unit or energy module. The bypass circuits 352, 354 may be operated to equalize the storage units 306. In addition to controlling or conducting power equalization in the storage units and energy modules, the bypass circuits 352, 354 may also be used to configure a power circuit that provides a designated voltage when the storage units are discharged thereby supplying a designated amount of electrical power to a power train.

Accordingly, the bypass circuits 352, 354 may include suitable circuitry (e.g., switches, diodes, resistors, etc.) for effectively bypassing one or more electrical components. During a charging operation, the energy management module 350 may monitor at least one storage parameter of the energy modules 302, 304, at least one storage parameter of one or more rows of storage units 306, and/or at least one storage parameter of one or more individual storage units 306. A storage parameter (or condition) may include a state of charge (SOC), a depth of charge (DOC), a terminal voltage, or an open-circuit voltage of the corresponding energy module/row/storage unit. With respect to the energy modules 302, 304, after detecting one or more storage parameters (e.g., SOC), the energy management module 350 may instruct the bypass circuit 352 to bypass one or more energy modules, but to continue charging one or more other energy modules. As a specific example, if the energy management module 350 determines that the energy module 302 is sufficiently charged based on the measured storage parameter, the energy management module 350 may instruct the bypass circuit 352 to direct the flow of current such that the current bypasses the energy module 302, but continues to charge the energy module 304.

In a similar manner, the energy management module 350 may monitor the charge of the rows 308-310 and/or individual storage units 306. After measuring a storage parameter for the rows or the individual storage units, the energy management module 350 may instruct corresponding bypass circuits 354 to bypass one or more rows and/or one or more storage units 306. For example, if the energy management module 350 determines that the storage unit 306A is sufficiently charged but that the storage unit 306B is not sufficiently charged, the energy management module 350 may instruct the corresponding bypass circuit 354 to direct the flow of current such that the current bypasses the storage unit 306A, but continues to charge the storage unit 306B.

Optionally, the bypass circuits 352, 354 of the energy storage system 300 may be configured to step-up or step-down a voltage of the electrical power that is supplied to a vehicle system. For example, when the vehicle system is no longer receiving electrical power from an external power source, the energy storage system 300 may be adapted or reconfigured to satisfy the needs of the power train. More specifically, during a discharge operation, the energy management module 350 may operate the bypass circuits 352, 354 to increase or decrease an effective voltage of the energy storage system 300 or an effective capacity of the energy storage system 300. The bypass circuits 352, 354 may selectively connect designated energy modules or designated storage units within the energy modules to discharge and supply the propulsion system with the designated electrical power.

For instance, when a vehicle system is not coupled to an external power source, an amount of electrical power required from the energy storage system 300 may be based on various factors, such as the geography of the route, the weight of the vehicle system, etc. Accordingly, the energy management module 350 may determine a circuit arrangement of the energy modules 302, 304 and/or the storage units 306 within the energy modules 302, 304 that satisfies the requested amount of electrical power. The energy management module 350 may instruct the bypass circuits 352, 354 to selectively connect the energy modules 302, 304 and/or storage units 306 so that the energy storage system 300 forms the designated circuit arrangement. For example, the bypass circuits 352, 354 may change to add or subtract storage units 306 in series. The circuit arrangement may change as the energy requirements of the vehicle system change. More specifically, the energy management module 350 may step-up or step-down the voltage supplied by the energy storage system 300 or increase or decrease the electrical power supplied by the energy storage system 300.

By way of example, when maximum power is required (e.g., about 6 MW), the energy management module 350 may instruct the bypass circuits 352, 354 to utilize each and every storage unit 306 during the discharge operation. However, when the vehicle system only requires a limited amount of power (e.g., 2 MW), such as when the vehicle system is coasting or stationary, the energy management module 350 may instruct the bypass circuits 352, 354 to discharge only a select number of the energy modules or a select number of the storage units within the energy modules.

In addition to the above, embodiments may also be configured to protect the vehicle system when one or more of the storage units form a ground fault. As shown, the energy modules 302, 304 may include module housings 312, 314, respectively. The module housings 312, 314 may be electrically isolated from a remainder of the vehicle system. For example, an exterior of the module housings 312, 314 may be insulated and the module housings 312, 314 may rest upon insulation elements (e.g., bushings) so that the module housings 312, 314 are galvanically isolated. The energy modules 302, 304 may also include a plurality of electrically insulated bushings 341-344 that isolate and insulate the module housings from incoming or outgoing conductors. More specifically, the bushing 341 insulates and isolates the module housing 312 from the first lead 322. The bushing 342 insulates and isolates the module housing 314 from the second lead 324, and the bushings 343, 344 insulate and isolate the module housing 312, 314 from the bank-to-bank bus 326, respectively.

However, the module housings 312, 314 may be selectively connected to a ground 316 through respective contactors 332, 334. The storage units 306 may not be electrically coupled to the module housings 312, 314. Instead, the storage units 306 for each of the energy modules 302, 304 may be electrically isolated from the module housing 312, 314. As such, the storage units 306 may be characterized as floating with respect to the module housings 312, 314. In some embodiments, the storage units 306 may also be electrically isolated from each other.

The energy storage system 300 may include a ground fault detector 360. In some embodiments, the ground fault detector 360 may be a voltage monitor or a current detector (e.g., current summation circuit). The ground fault detector 360 may be electrically coupled to the positive polarity conductor and the negative polarity conductor of the DC bus 320. The ground fault detector 360 may also be electrically coupled to the module housings 312, 314. During operation of the energy storage system 300, one of the storage units 306 may go to ground. For example, the storage unit 306B may become damaged such that the storage unit 306B goes to ground (e.g., forms an unwanted or inadvertent electrical connection with the module housing 312). In this case, the ground fault detector 360 may be configured to identify a change in voltage (or current) with respect to the module housing 312 and the DC bus 320. Based on the voltage change, the energy management module 350 may determine that a ground fault exists. However, even if a ground fault has occurred, the energy storage system 300 may be still operational and the DC bus 320 may receive and/or supply electrical power.

After identifying that a ground fault exists within the energy module 302, a technician may be alerted to the ground fault condition. When appropriate, the technician may then close the contactor 332 so that the module housing 312 is grounded. The technician may then inspect the energy module 302 to identify where the ground fault occurred.

FIG. 4 is a schematic diagram of a power train or assembly 400 formed in accordance with one embodiment. The power train 400 may be part of a vehicle or vehicle system, such as the vehicle system 100 (FIG. 1), and may be similar to the power trains 101 (FIG. 1) and 200 (FIG. 2). For example, the power train 400 includes a power receiver 402, which in the illustrated embodiment is a catenary package configured to engage overhead lines 404 of an external power source 406. The power train 400 also includes a main transformer 412, which includes a plurality of secondary windings 414 in the illustrated embodiment. One of the secondary windings 414 is operably coupled to and configured to provide a sufficient amount of power for a remainder of the power train 400. The other secondary windings 414 may be operably coupled to other assemblies of the vehicle system.

The transformer 412 is connected to and configured to supply electrical power to a first or front-end bus 416. The front-end bus 416 supplies the electrical power to a converter device 418. Similar to the converter device 218, the converter device 418 interconnects the front-end bus 416 and a DC bus 428. The DC bus 428, in turn, is electrically connected to a propulsion system 420, a conditioning device 422, and an auxiliary system 424, which may be similar to the propulsion system 220, the conditioning device 222, and the auxiliary system 224 in FIG. 2. The power train 400 may also include an energy storage system 430, which may be similar to the energy storage system 300.

Similar to the power train 200, the power train 400 may include a control system 401 that includes voltage monitors 452, 453 configured to determine a voltage parameter (e.g., voltage or current) of the DC bus 428 and the front-end bus 416, respectively. The control system 401 may also include a device-control module 454 that is configured to control operation of the converter device 418, and an energy management module 456 that is configured to control operation of the energy storage system 430. Operation of the device-control module 454 and the energy management module 456 may be based on data (e.g., measurements) received from other components of the vehicle system.

Unlike the converter device 218, the converter device 418 of the power train 400 does not modify electrical power supplied by the energy storage system 430. Instead, the power train 400 may utilize the reconfigurable features described above with respect to the energy storage system 300 such that a charging or discharging voltage of the energy storage system 430 may be selectively configured based on operation of the power train 400. For example, if the propulsion system 420 requires 1000V to power the traction motor, but the energy storage system 430 has a present voltage of 800V, the energy management module 456 may control bypass circuits (not shown) to form a circuit arrangement that has a voltage of 1000V. Likewise, the energy storage system 430 may be used for power equalization as described above.

Figure 5:
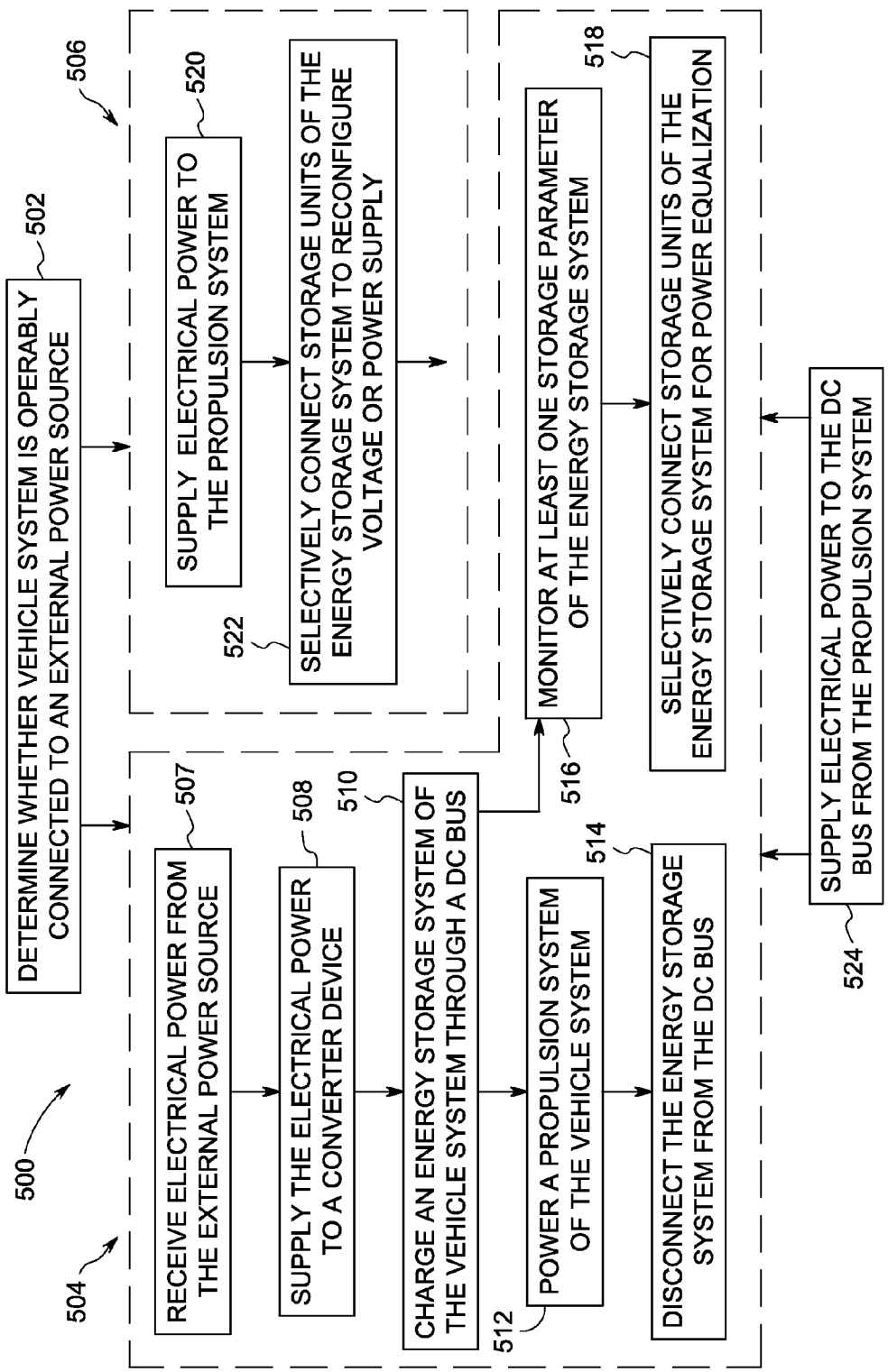
FIG. 5 illustrates a flowchart of a method of operating a vehicle system that includes an energy storage system.

FIG. 5 illustrates a flowchart of a method 500 of operating a vehicle system that includes an energy storage system. The method 500, for example, may employ structures or aspects of various embodiments (e.g., systems and/or methods) discussed herein, such as those described with respect to FIGS. 1-4. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 500 may include determining (at 502) whether the vehicle system is operably connected to an external power source (e.g., overhead line, third rail, and the like). The determining (at 502) may be triggered when, for example, a monitor or detector detects that the vehicle system has engaged or disengaged the external power source. For instance, the monitor or detector may be part of a power receiver that engages the external power source. The monitor or detector may detect an abrupt change in voltage or current at the power receiver and then communicate with a control system to inform the control system that a status of the power supply has changed. In other embodiments, the determining (at 502) may include frequently querying the monitor or detector regarding whether the power receiver is operably engaged to the external power source.

Based on this determination, the method 500 may proceed operating the vehicle system according to an external-supply mode 504, if the vehicle system is operably connected to the external power source, or an internal-supply mode 506, if the vehicle system is not operably connected to the external power source. In the external-supply mode 504, the method 500 may include receiving electrical power (at 507) from the external power source and supplying (at 508) the electrical power to a converter device through a front-end bus. The converter device may be configured to convert the electrical power to DC power and supply the DC power to a DC bus. The method 500 may also include charging (at 510) an energy storage system that is selectively connected to the DC bus and powering (at 512) a propulsion system connected to the DC bus. The charging (at 510) and powering (at 512) may occur simultaneously or concurrently.

In some embodiments, the charging (at 510) and powering (at 512) may only intermittently or occasionally occur at the same time. For example, it may be determined during the external-supply mode that the energy storage system is sufficiently charged. It could also be determined that the vehicle system requires maximum power. During such instances, the method 500 may include disconnecting (at 514) the energy storage system from the DC bus.

The method 500 may also include monitoring (at 516) at least one storage parameter of the energy storage system. For example, the control system may monitor a storage parameter of an energy module, rows or strings of storage units in the energy modules, or individual storage units. Based on this monitoring, the method 500 may include selectively connecting (at 518) the storage units to form a designated circuit arrangement. The designated circuit arrangement may be configured to charge select storage units and to not charge other storage units so that the storage units become more energy balanced.

At some point during operation of the vehicle system, the method 500 may determine (at 502) that the vehicle system is not operably connected to the external power source. At such determination, the method 500 may operate the vehicle system according to the internal-supply mode 506. At 520, the method 500 may include supplying electrical power from the energy storage system to one of the front-end bus or the DC bus to power a propulsion system of the vehicle system. In some embodiments, the supplying (at 520) includes determining whether the electrical power should be supplied to a converter device connected to the front-end bus or directly to the DC bus. For example, if the voltage of the energy storage system is approximately equal to the voltage requirements of the propulsion system, the supplying (520) may include directly providing the electrical power to the DC bus. However, if the voltage requirements of the propulsion system are not equal to the voltage of the energy storage system, the electrical power may be supplied to the front-end bus, wherein the converter device increases or decreases the voltage.

In some embodiments, the method 500 may include selectively connecting (at 522) the storage units of the energy storage system to form a designated circuit arrangement. For example, in one or more embodiments, the energy storage system may not be capable of connecting to the front-end bus. In such embodiments, the energy storage system may be reconfigured to provide the DC bus with the required voltage. For example, the control system may operate the bypass circuits to selectively connect the storage units so that the designated voltage is provided.

During the external supply mode 504 or the internal-supply mode 506, the method 500 may include supplying (at 524) electrical power to the DC bus from the propulsion system. For example, during a dynamic braking operation, the traction motor may generate electrical power that is converted by the inverter into DC power. In some embodiments, based on the voltage of the DC power, the DC power may be supplied directly to the DC bus or supplied to the converter device that modifies the DC power.

Although embodiments described herein may respond to human-initiated queries or operations, one or more embodiments may be operated according to a designated trip plan. More specifically, the operation of the various power components (e.g., converter devices, contactors, etc.) may be operated according to a predetermined trip plan. The trip plan may designate operations of the vehicle system over the course of a trip along one or more routes (e.g., tracks, roads, waterways, or the like) in order to achieve some goal, such as to reduce energy consumption, arrive at a destination on time, etc. More specifically, a trip plan may designate tractive output (e.g., tractive effort, power output, speed, acceleration, and the like) and/or braking effort as a function of time elapsed during the trip and/or distance along a route of the trip such that, if the vehicle system actually operates according to the designated operations (e.g., designated operational settings), the vehicle system will reduce the amount of energy consumed.

The trip plan can be based on at least one of vehicle data, route data, or trip data to generate the trip plan and may also include operating data. Vehicle data may include information on the characteristics of the vehicle. For example, when the vehicle system is a rail vehicle, the vehicle data may include a number of rail cars, number of locomotives, information relating to an individual locomotive or a consist of locomotives (e.g., model or type of locomotive, weight, power description, performance of locomotive traction transmission, cooling characteristics), load of a rail vehicle with effective drag coefficients, vehicle-handling rules (e.g., tractive effort ramp rates, maximum braking effort ramp rates), content of rail cars, lower and/or upper limits on power (throttle) settings, etc.

Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations.

Trip data may include information relating to a designated mission or trip, such as start and end times of the trip, start and end locations, route data that pertains to the designated route (e.g., effective track grade and curvature as function of milepost, speed limits), upper cumulative and/or instantaneous limits on emissions for the trip, energy consumption permitted for the trip, historical trip data (e.g., how much energy was used in a previous trip along the designated route), desired trip time or duration, crew (user and/or operator) identification, crew shift expiration time, lower and/or upper limits on power (throttle) settings for designated segments, etc.

As one specific example, operations of the first and second contactors 236, 238 (FIG. 2) may be based on the designated trip plan. For example, based on the trip plan, the control system 201 may close the first contactor 236 and open the second contactor 238 when the vehicle system approaches or passes a point in which the external power source (e.g., overhead lines) is no longer available. When the vehicle system is operably connected to the external power source, the control system 201 may open the first and second contactors 236, 238 when the control system 201 knows that the propulsion system will require maximum power. For example, the trip plan may indicate that a steep incline is approaching. Accordingly, the control system 201 may open both of the first and second contactors 236, 238.

Figure 6:
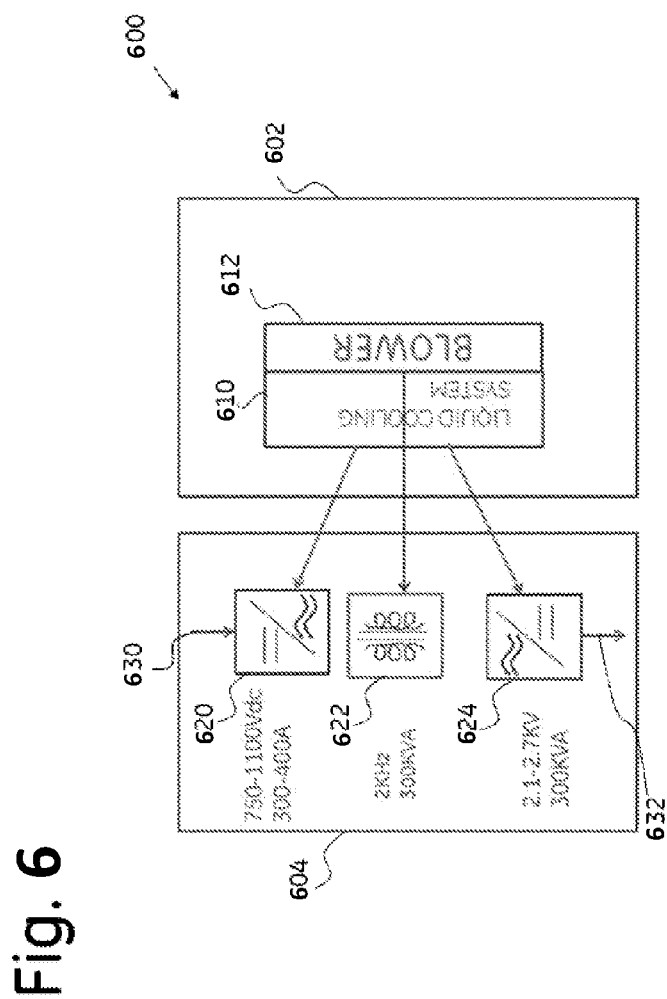
FIG. 6 is a schematic diagram of a system formed in accordance with one embodiment.

FIG. 6 illustrates an energy storage system 600 in accordance with one embodiment that may be used with a power train, such as the power trains 200, 300 of FIGS. 2 and 3, respectively. However, the energy storage system 600 is not limited to only applications with the power trains 200, 300 but may be used with other power trains and vehicle systems. In one aspect, multiple energy modules are provided. At least a portion of these energy modules are electrically connected in parallel. The connected energy modules may supply 2, 3, 4, . . . n . . . bus systems with electrical power. Any "remainder" energy modules may be utilized for load balancing within individual bus systems. For example, with 15 energy modules and 4 bus systems, 3 energy modules may be connected in parallel for each bus system for a total of 12 energy modules. As such, 3 energy modules are the remainder modules. The remainder modules are not connected in parallel, but can be used for load balancing of the individual bus systems.

The remainder modules can be switched using a power switch. Suitable power switches can include, for example, two dual pole contactors or switches. Power switches may be a momentary on-off switch that opens or closes a circuit for a defined period, or one that has a constant on-off feature. A dual pole switch may incorporate both of these features.

With reference to FIG. 6, a system 600 for operating a vehicle system or sub-systems of the vehicle system is shown. The system 600 includes a thermal management system 602 that is functionally coupled to a module 604, which may be a power train. The thermal management system 602 includes a blower 612 and a cooling system 610. The cooling system 610 illustrated is a liquid cooling system. Based on application specific parameters, other cooling systems may be used to include heat pipes, thermal spreaders, and the like. The module 604 includes an AC/DC converter 620, a transformer with center tap 622, and another AC/DC converter 624. First and second terminal leads 630, 632 facilitate electrical contact of the module with other devices, including other modules.

A suitable transformer may include one or more inductively coupled conductors. A transformer may include a boost converter or a buck-boost converter. Other suitable transformers may include a switched-mode power supply (SMPS), and optionally may include a current limiting or crowbar circuit. And, depending on the direction of conversion, an inverter or rectifier may be included.

In one embodiment, a weight of the thermal management system 602 is in a range that is less than about 299 kg, or in a range of from about 300 kilograms (kg) to about 350 kg or from about 351 kg to about 400 kg. The mass and weight of the thermal management system 602 may be selected based on application specific criteria. The module 604, in one embodiment, may have a weight that is in a range that is less than about 149 kg, or in a range of from about 150 kilograms (kg) to about 200 kg or from about 201 kg to about 300 kg. The mass and weight of the module 604 may be selected based on application specific criteria. In the illustrated embodiment, the combined total weight of a super module containing both one module 604 and one thermal management system 602 is about 550 kg. Alternative super module embodiments may include one thermal management system 602 with multiple modules, or conversely one module with multiple thermal management systems. In one embodiment, a thermal management system 602 is "sandwiched" between two modules, with one module on either side, and is communicatively coupled to each.

With regard to physical dimension, such are subject to multiple constraints that differ from one implementation to another. Packaging challenges may dictate dimensions, but in one embodiment the thermal management system 602 and module 604 are of about the same sizes as each other. In the illustrated embodiment, the dimensions are about 950 millimeters (mm)×530 mm×320 mm.

In one embodiment, using a liquid-based thermal management system 602 and a 3×3 flat configuration, the super module height can be 45 centimeters (cm) to accommodate the inverter. The other dimensions may be determined with reference to any energy storage device or battery. The cooling piping may couple to a common heat exchanger.

With reference to the inverter, one suitable inverter may generate about 10 kilowatts (kW) of heat when running at 250 kilovolt-amps (kVA). In one embodiment about 250 kVA may be a peak steady state condition. For excursions, of less than about two minutes it may be able to support about 300 kVA. In an alternative embodiment, pre-cooling may be used to dissipate up to or additionally 12 kW of power. Further, adjustments may be controllable made to the duty cycle to affect the heat generation rate.

In one embodiment, an eight battery module system has an 160 kWHr capability. For a 10 battery module system an increasingly large inverter may be used.

Such super modules as described herein can be arranged and allocated among multiple power transfer bus systems. In one embodiment, four power-transfer bus systems may be used with a total energy of approximately 2 MWh to 3 MWh. 12-15 super modules of 160 kWh each can be arranged to enable power balancing and redundancy. The following table and description provides one such example, but it is understood that other configurations can be used. The following configuration can be optimized in which the sum of the cooling system can be combined for multiple super modules into groups for redundancy as needed. Positioning such super modules in an arrangement, such as in FIG. 1, may reduce the inverter complexity and improve inverter efficiency of the individual super modules. In an alternative embodiment, other battery configurations that do not require isolation can be used thereby eliminating the need for a super module. In some embodiments, a benefit of the super module is due its ability to de-couple the intermediate bus requirements (see, e.g., FIG. 1 and the voltage across the converter device 112).

Because inverters allow selective power down of any single one or combination of the energy modules via the controller or battery management system (BMS) it is possible to have, for example, the following combinations, in which the remainder energy modules are used for load balancing:

| Total Energy Module Count | Bus System 1 | Bus System 2 | Bus System 3 | Bus System 4 |
|---|---|---|---|---|
| 12 | 3 | 3 | 3 | 3 |
| 13 | 4 | 3 | 3 | 3 |
| 13 | 3 | 4 | 3 | 3 |
| 13 | 3 | 3 | 4 | 3 |
| 13 | 3 | 3 | 3 | 4 |
| 14 | 4 | 3 | 4 | 3 |
| 14 | 4 | 3 | 3 | 4 |
| 14 | 3 | 4 | 4 | 3 |
| 14 | 3 | 5 | 3 | 3 |
| 14 | 3 | 3 | 5 | 3 |
| 15 | 3 | 4 | 4 | 4 |
| 15 | 4 | 3 | 4 | 4 |
| 15 | 4 | 4 | 3 | 4 |
| 15 | 4 | 4 | 4 | 3 |
| 15 | 3 | 5 | 3 | 4 |
| 15 | 3 | 4 | 5 | 3 |

Reference herein is made to a battery and energy storage device. In either case, these terms are used interchangeably unless context or language indicates otherwise. Suitable batteries include, for example, General Electric Company Durathon brand sodium nickel metal halide batteries. Other suitable batteries can include lithium ion batteries, zinc air batteries, and lead acid batteries. Batteries can be selected based on application specific requirements and are not readily substitutable for each other. In one embodiment, the energy storage device may be a fuel cell or a capacitor, or may include a mechanical storage device such as a spring, flywheel, or compressed gas system. Hybrid batteries may be used that include two or more of the foregoing, such as a combination of lithium ion battery and a capacitor in a single package.

The various modules described herein may be implemented as part of one or more computers, computing systems, or processors. The computer, computing system, or processor may include a microprocessor. The microprocessor may be connected to a communication bus. The computer or processor may also include a memory. The memory may include Random Access Memory (RAM) and Read Only Memory (ROM). The computer or processor further may include a storage system or device, which may be a hard disk drive or a removable storage drive such as a floppy disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

In one embodiment, a system is provided that includes a switch control module configured to control operation of a first contactor and a second contactor in a vehicle system. The first and second contactors are configured to selectively connect front-end and direct-current (DC) buses, respectively, to an energy storage system of the vehicle system. The front-end bus is configured to receive electrical power from an external power source and provide the electrical power to a converter device. The converter device is configured to supply DC power to the DC bus. The DC bus is configured to be coupled to a propulsion system of the vehicle system and configured to have a designated traction voltage for powering the propulsion system that is approximately equal to a charging voltage of the energy storage system. The switch control module is configured to close the second contactor when the vehicle system is operably coupled to the external power source. The converter device configured to provide the DC power to the DC bus so that the energy storage system is charged and the propulsion system receives the DC power. The switch control module is also configured to close one of the first contactor or the second contactor when the vehicle system is operably decoupled to the external power source. The energy storage system is configured to supply the electrical power to the propulsion system when the vehicle system is operably decoupled to the external power source.

In one aspect, the switch control module may be configured to close the first contactor to supply the electrical power from the energy storage system to the converter device. The system may also include a device-control module that is operably coupled to the converter device. The device-control module is configured to control operation of the converter device so that the converter device increases or decreases a voltage of the electrical power supplied by the energy storage system.

In one aspect, a device-control module may be operably coupled to the converter device. The device-control module may be configured to control operation of the converter device so that the converter device increases or decreases a voltage of the electrical power supplied by the external power source.

In one aspect, a voltage monitor may be communicatively coupled to the switch control module and may be configured to determine a voltage parameter of the DC bus. The switch control module is configured to determine whether to at least one of close the first contactor or close the second contactor based on the voltage parameter.

In one aspect, the switch control module is configured to control the first and second contactors during a regenerative mode in which the second contactor is closed while the vehicle system is braking.

In one aspect, the system includes an energy management module that may be operably coupled to the energy storage system. The energy management module may be configured to determine whether a ground fault exists in the energy storage system.

In one aspect, the system includes an energy management module that is operably coupled to bypass circuits of the energy storage system in which the energy storage system includes a plurality of energy storage units selectively connected to one another. The energy management module is configured to control the bypass circuits to selectively connect more or fewer of the storage units to achieve a designated voltage or power.

In one aspect, the system does not include a voltage converter between an output of the energy storage system and an input of the propulsion system when the electrical power is supplied through the second contactor.

In one aspect, the system does not include a transformer between an output of the energy storage system and an input of the propulsion system when the electrical power is supplied through the second contactor.

In one aspect, the electrical power from an output of the energy storage system to an input of the propulsion system is only converted by the converter device when the electrical power is supplied through the first contactor.

In one aspect, the electrical power remains in an uncoverted state between an output of the energy storage system and an input of the propulsion system when the electrical power is supplied through the second contactor.

In one aspect, the electrical power remains in an untransformed state between an output of the energy storage system and an input of the propulsion system when the electrical power is supplied through the second contactor.

In one aspect, the vehicle system includes a locomotive and the external power source includes an overhead line or a third rail.

In another embodiment, a power train of a vehicle system is provided that includes a converter device configured to receive electrical power from an external power source and front-end and direct-current (DC) buses electrically interconnected by the converter device. The converter device is configured to receive the electrical power from the external power source through the front-end bus and provide DC power to the DC bus. The power train may also include a propulsion system that is configured to provide tractive effort for moving the vehicle system. The propulsion system is operably connected to the DC bus and configured to receive the DC power from the DC bus. The power train may also include an energy storage system that is configured to be selectively connected to the front-end and DC buses through first and second contactors, respectively. The power train may also include a switch control module that is configured to control operation of the first and second contactors. The switch control module is configured to close the second contactor when the power train is operably coupled to the external power source such that the energy storage system is charged and the propulsion system receives the DC power. The switch control module is also configured to close one of the first contactor or the second contactor when the power train is operably decoupled to the external power source. The energy storage system is configured to supply the electrical power to the propulsion system when the vehicle system is operably decoupled to the external power source.

In one aspect, the electrical power remains in an uncoverted state between an output of the energy storage system and an input of the propulsion system when the electrical power is supplied through the second contactor.

In one aspect, the electrical power remains in an untransformed state between an output of the energy storage system and an input of the propulsion system when the electrical power is supplied through the second contactor.

In one aspect, the power train does not include a voltage converter between an output of the energy storage system and an input of the propulsion system when the electrical power is supplied through the second contactor.

In one aspect, the power train does not include a transformer between an output of the energy storage system and an input of the propulsion system when the electrical power is supplied through the second contactor.

In one aspect, the electrical power from an output of the energy storage system to an input of the propulsion system is only converted by the converter device when the electrical power is supplied through the first contactor.

In one aspect, the switch control module is configured to close the first contactor to supply the electrical power from the energy storage system to the converter device. The power train may also include a device-control module that is operably coupled to the converter device. The device-control module is configured to control operation of the converter device so that the converter device increases or decreases a voltage of the electrical power supplied by the energy storage system.

In one aspect, a device-control module may be operably coupled to the converter device. The device-control module may be configured to control operation of the converter device so that the converter device increases or decreases a voltage of the electrical power supplied by the external power source.

In one aspect, the electrical power received from the external power source is alternating current (AC) power. The converter device may be configured to convert the AC power to the DC power that is supplied to the DC bus.

In one aspect, the switch control module may be configured to control the first and second contactors during a regenerative mode in which the second contactor is closed while the vehicle system is braking.

In one aspect, the power train may include an energy management module that is operably coupled to bypass circuits of the energy storage system. The energy storage system may include a plurality of energy storage units selectively connected to one another. The energy management module may be configured to control the bypass circuits to selectively connect more or fewer of the storage units to achieve a designated voltage or power.

In one aspect, the energy storage system may include a plurality of storage units coupled to one another in a parallel-series arrangement. The storage units may be allocated into first and second sets of storage units in which each of the first and second sets is held within a grounded module housing.

In one aspect, the energy storage system is configured to provide at least one megawatt of power to the propulsion system.

In one aspect, the vehicle system includes a locomotive and the external power source includes an overhead line or a third rail.

In another embodiment, a power train of a vehicle system is provided that includes a converter device configured to receive electrical power from an external power source and supply direct current (DC) power to a DC bus of the vehicle system. The power train may also include a propulsion system that has a fraction motor for moving the vehicle system. The propulsion system is configured to receive the DC power through the DC bus. The power train also includes an energy storage system operably connected to the DC bus, wherein the energy storage system has a designated charging voltage and is configured to operate in a charging mode and in a supply mode. The vehicle system is operably connected to the external power source in the charging mode, and the vehicle system is not operably connected to the external power source in the supply mode. The designated charging voltage is approximately equal to a voltage requirement of the traction motor at a determined torque such that the energy storage system can be charged through the DC bus during the charging mode. The propulsion system can be supplied power through the DC bus from the energy storage system during the supply mode without a voltage converter being disposed between an output of the energy storage system and an input of the propulsion system.

In one aspect, the energy storage system is selectively disconnected from the DC bus when the DC bus has a voltage that is substantially different than the designated charging voltage of the energy storage system.

In one aspect, the energy storage system supplies electrical power directly to the DC bus for the propulsion system when the vehicle system is not operably connected to the external power source.

In one aspect, the traction motor is configured to operate in a dynamic braking mode to provide electrical power to the DC bus at a voltage that is approximately equal to the designated charging voltage of the energy storage system.

In one aspect, the energy storage system includes a plurality of storage units coupled to one another in a parallel-series arrangement. The storage units may be allocated into first and second sets of storage units in which each of the first and second sets is held within a grounded module housing.

In one aspect, the energy storage system is configured to provide at least one megawatt of power to the propulsion system.

In another embodiment, a method of powering a vehicle system that is configured to receive electrical power from an external power source and that includes an energy storage system is provided. The method includes supplying the electrical power to a converter device through a front-end bus when the vehicle system is operably connected to the external power source. The converter device is configured to convert the electrical power to DC power and supply the DC power to a DC bus. The method also includes charging an energy storage system that is selectively connected to the DC bus when the vehicle system is operably connected to the external power source while simultaneously powering a propulsion system connected to the DC bus. The method also includes determining that the vehicle system is operably decoupled to the external power source. The method also includes supplying electrical power from the energy storage system to one of the front-end bus or the DC bus to power the propulsion system when the vehicle system is operably decoupled to the external power source.

In one aspect, supplying electrical power from the energy storage system to one of the front-end bus or the DC bus includes closing a first contactor to electrically connect the energy storage system to the front-end bus.

In one aspect, the method may also include increasing or decreasing a voltage of the electrical power that is supplied by the energy storage system to the front-end bus using the converter device.

In one aspect, a voltage of the electrical power from the energy storage is only converted by the converter device prior to powering the propulsion system.

In one aspect, the energy storage system includes an output and the propulsion system includes an input, the electrical power being supplied directly from the output of the energy storage system to the input of the propulsion system without converting a voltage of the electrical power.

In one aspect, the energy storage system is configured to provide at least one megawatt of power to the propulsion system.

In one aspect, the energy storage system includes a plurality of energy storage units and a plurality of bypass circuits that selectively connect the storage units to one another. The method may also include selectively connecting more or fewer of the storage units through the bypass circuits to achieve a designated voltage or power.

In one aspect, the vehicle system is a locomotive and the external power source is an overhead line or a third rail.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuit. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

What is claimed is:

1. A system comprising:
   a switch control module configured to control operation of a first contactor and a second contactor in a vehicle system, the first and second contactors configured to selectively connect front-end and direct-current (DC) buses, respectively, to an energy storage system of the vehicle system, the front-end bus configured to receive electrical power from an external power source and provide the electrical power to a converter device, the converter device configured to supply DC power to the DC bus. the DC bus configured to he coupled to a propulsion system of the vehicle system and configured to have a designated traction voltage for powering the propulsion system that is approximately equal to a charging voltage of the energy storage system;
   wherein the switch control module is configured to close the second contactor when the vehicle system is operably coupled to the external power source, the converter device configured to provide the DC power to the DC bus so that the energy storage system is charged and the propulsion system receives the DC power;
   wherein the switch control module is configured to close one of the first contactor or the second contactor when the vehicle system is operably decoupled to the external power source. the energy storage system configured to supply the electrical power to the propulsion system when the vehicle system is operably decoupled to the external power source, and
   wherein the switch control module is configured to control the first and second contactors during a regenerative mode in which the second contactor is closed while the vehicle system is braking.

2. The system of claim 1, wherein the switch control module is configured to close the first contactor to supply the electrical power from the energy storage system to the converter device, the system further comprising a device-control module operably coupled to the converter device, the device-control module configured to control operation of the converter device so that the converter device changes a voltage of the electrical power supplied by the energy storage system.

3. The system of claim 1, further comprising a device-control module configured to be operably coupled to the converter device, the device-control module configured to control operation of the converter device so that the converter device changes a voltage of the electrical power supplied by the external power source.

4. The system of claim 1, further comprising a voltage monitor that is configured to determine a voltage parameter of the DC bus and that is configured to be communicatively coupled to the switch control module, the switch control module configured to determine whether to at least one of close the first contactor or close the second contactor based on the voltage parameter.

5. A system comprising:
   an energy management module; and
   a switch control module configured to control operation of a first contactor and a second contactor in a vehicle system, the first and second contactors configured to selectively connect front-end and direct-current (DC) buses, respectively, to an energy storage system of the vehicle system, the front-end bus configured to receive electrical power from an external power source and provide the electrical power to a converter device, the converter device configured to supply DC power to the DC bus, the DC bus configured to be coupled to a propulsion system of the vehicle system and configured to have a designated traction voltage for powering the propulsion system that is approximately equal to a charging voltage of the energy storage system;

wherein the switch control module is configured to close the second contactor when the vehicle system is operably coupled to the external power source, the converter device configured to provide the DC power to the DC bus so that the energy storage system is charged and the propulsion system receives the DC power;

wherein the switch control module is configured to close one of the first contactor or the second contactor when the vehicle system is operably decoupled to the external power source, the energy storage system configured to supply the electrical power to the propulsion system when the vehicle system is operably decoupled to the external power source; and wherein the energy management module is operably coupled to the energy storage system, the energy management module configured to determine whether a ground fault exists in the energy storage system.

6. The system of claim 1, further comprising an energy management module that is configured to be operably coupled to bypass circuits of the energy storage system in which the energy storage system includes a plurality of energy storage units selectively connected to one another, the energy management module configured to control the bypass circuits to selectively connect more or fewer of the storage units to achieve a designated voltage or power.

7. The system of claim 1, wherein the electrical power remains in an unconverted state between an output of the energy storage system and an input of the propulsion system when the electrical power is supplied through the second contactor.

8. A system comprising:
a switch control module configured to control operation of a first contactor and a second contactor in a vehicle system, the first and second contactors configured to selectively connect front-end and direct-current (DC) buses, respectively, to an energy storage system of the vehicle system, the front-end bus configured to receive electrical power from an external power source and provide the electrical power to a converter device, the converter device configured to supply DC power to the DC bus, the DC bus configured to be coupled to a propulsion system of the vehicle system and configured to have a designated traction voltage for powering the propulsion system that is approximately equal to a charging voltage of the energy storage system;

wherein the switch control module is configured to close the second contactor when the vehicle system is operably coupled to the external power source, the converter device configured to provide the DC power to the DC bus so that the energy storage system is charged and the propulsion system receives the DC power;

wherein the switch control module is configured to close one of the first contactor or the second contactor when the vehicle system is operably decoupled to the external power source, the energy storage system configured to supply the electrical power to the propulsion system when the vehicle system is operably decoupled to the external power source; and wherein the electrical power remains in an untransformed state between an output of the energy storage system and an input of the propulsion system when the electrical power is supplied through the second contactor.

9. The system of claim 1, wherein the electrical power from an output of the energy storage system to an input of the propulsion system is only converted by the converter device when the electrical power is supplied through the first contactor.

10. A system comprising:
an energy storage system disposed in a vehicle system;
a switch control module configured to control operation of a first contactor and a second contactor in the vehicle system, the first and second contactors configured to selectively connect front-end and direct-current (DC) buses, respectively, to the energy storage system, the front-end bus configured to receive electrical power from an external power source and provide the electrical power to a converter device, the converter device configured to supply DC power to the DC bus, the DC bus configured to be coupled to a propulsion system of the vehicle system and configured to have a designated fraction voltage for powering the propulsion system that is approximately equal to a charging voltage of the energy storage system;

wherein the switch control module is configured to close the second contactor when the vehicle system is operably coupled to the external power source, the converter device configured to provide the DC power to the DC bus so that the energy storage system is charged and the propulsion system receives the DC power;

wherein the switch control module is configured to close one of the first contactor or the second contactor when the vehicle system is operably decoupled to the external power source, the energy storage system configured to supply the electrical power to the propulsion system when the vehicle system is operably decoupled to the external power source; and wherein the energy storage system includes a set of energy modules that are configured to supply power to a plurality of bus systems, the set of energy modules including dedicated modules and remainder modules, each of the bus systems being exclusively supplied electrical power from a respective plurality of the dedicated modules, the dedicated modules in each respective plurality being electrically parallel to the other dedicated modules in the respective plurality, wherein the remainder modules are configured for load balancing such that the remainder modules are configured to switch from supplying one of the bus systems with electrical power to supplying another of the bus systems with electrical power.

11. A power train of a vehicle system comprising:
a converter device configured to receive electrical power from an external power source:
front-end and direct-current (DC) buses electrically interconnected by the converter device, the converter device configured to receive the electrical power from the external power source through the front-end bus and provide DC power to the DC bus;
a propulsion system configured to provide tractive effort for moving the vehicle system, the propulsion system being operably connected to the DC bus and configured to receive the DC power from the DC bus;
an energy storage system configured to be selectively connected to the front-end and DC buses through first and second contactors, respectively; and
a switch control module configured to control operation of the first and second contactors, the switch control module configured to close the second contactor when the power train is operably coupled to the external power source such that the energy storage system is charged and the propulsion system receives the DC power, the switch control module configured to close one of the first contactor or the second contactor when the power train is operably decoupled to the external power source, the energy storage system configured to supply the electrical power to the propulsion system when the vehicle system is operably decoupled to the external power source, wherein the electrical power received from the external power source is alternating current (AC) power, the converter device configured to convert the AC power to the DC power that is supplied to the DC bus.

12. The power train of claim 11, wherein the electrical power remains in an unconverted state between an output of the energy storage system and an input of the propulsion system when the electrical power is supplied through the second contactor.

13. A power train of a vehicle system comprising:
a converter device configured to receive electrical power from an external power source;
front-end and direct-current (DC) buses electrically interconnected by the converter device, the converter device configured to receive the electrical power from the external power source through the front-end bus and provide DC power to the DC bus;
a propulsion system configured to provide tractive effort for moving the vehicle system, the propulsion system being operably connected to the DC bus and configured to receive the DC power from the DC bus;
an energy storage system configured to be selectively connected to the front-end and DC buses through first and second contactors, respectively; and
a switch control module configured to control operation of the first and second contactors, the switch control module configured to close the second contactor when the power train is operably coupled to the external power source such that the energy storage system is charged and the propulsion system receives the DC power, the switch control module configured to close one of the first contactor or the second contactor when the power train is operably decoupled to the external power source, the energy storage system configured to supply the electrical power to the propulsion system when the vehicle system is operably decoupled to the external power source;
wherein the electrical power remains in an untransformed state between an output of the energy storage system and an input of the propulsion system when the electrical power is supplied through the second contactor.

14. The power train of claim 11, wherein the electrical power from an output of the energy storage system to an input of the propulsion system is only converted by the converter device when the electrical power is supplied through the first contactor.

15. The power train of claim 11, wherein the switch control module is configured to close the first contactor to supply the electrical power from the energy storage system to the converter device, the power train further comprising a device-control module operably coupled to the converter device, the device-control module configured to control operation of the converter device so that the converter device increases or decreases a voltage of the electrical power supplied by the energy storage system.

16. The power train of claim 11, further comprising a device-control module configured to be operably coupled to the converter device, the device-control module configured to control operation of the converter device so that the converter device increases or decreases a voltage of the electrical power supplied by the external power source.

17. A power train of a vehicle system comprising:
a converter device configured to receive electrical power from an external power source;
front-end and direct-current (DC) buses electrically interconnected by the converter device, the converter device configured to receive the electrical power from the external power source through the front-end bus and provide DC power to the DC bus;
a propulsion system configured to provide tractive effort for moving the vehicle system, the propulsion system being operably connected to the DC bus and configured to receive the DC power from the DC bus;
an energy storage system configured to be selectively connected to the front-end and DC buses through first and second contactors, respectively; and
a switch control module configured to control operation of the first and second contactors, the switch control module configured to close the second contactor when the power train is operably coupled to the external power source such that the energy storage system is charged and the propulsion system receives the DC power, the switch control module configured to close one of the first contactor or the second contactor when the power train is operably decoupled to the external power source, the energy storage system configured to supply the electrical power to the propulsion system when the vehicle system is operably decoupled to the external power source;
wherein the switch control module is configured to control the first and second contactors during a regenerative mode in which the second contactor is closed while the vehicle system is braking.

18. A power train of a vehicle system comprising:
a converter device configured to receive electrical power from an external power source;
front-end and direct-current (DC) buses electrically interconnected by the converter device, the converter device configured to receive the electrical power from the external power source through the front-end bus and provide DC power to the DC bus;
a propulsion system configured to provide tractive effort for moving the vehicle system, the propulsion system being operably connected to the DC bus and configured to receive the DC power from the DC bus;
an energy storage system configured to be selectively connected to the front-end and DC buses through first and second contactors, respectively; and
a switch control module configured to control operation of the first and second contactors, the switch control module configured to close the second contactor when the power train is operably coupled to the external power source such that the energy storage system is charged and the propulsion system receives the DC power, the switch control module configured to close one of the first contactor or the second contactor when the power train is operably decoupled to the external power source, the energy storage system configured to supply the electrical power to the propulsion system when the vehicle system is operably decoupled to the external power source;
wherein the energy storage system includes a set of energy modules that are configured to supply power to a plurality of bus systems, the set of energy modules including dedicated modules and remainder modules, each of the bus systems being exclusively supplied electrical power from a respective plurality of the dedicated modules, the dedicated modules in each respective plurality being electrically parallel to the other dedicated modules in the respective plurality, wherein the remainder modules are configured for load balancing such that the remainder modules are configured to switch from supplying one of the bus systems with electrical power to supplying another of the bus systems with electrical power.

19. The power train of claim 11, further comprising an energy management module that is configured to be operably coupled to bypass circuits of the energy storage system, the energy storage system including a plurality of energy storage units selectively connected to one another, the energy management module configured to control the bypass circuits to selectively connect more or fewer of the storage units to achieve a designated voltage or power.

20. A power train of a vehicle system comprising:
a converter device configured to receive electrical power from an external power source;
front-end and direct-current (DC) buses electrically interconnected by the converter device, the converter device configured to receive the electrical power from the external power source through the front-end bus and provide DC power to the DC bus;
a propulsion system configured to provide tractive effort for moving the vehicle system, the propulsion system being operably connected to the DC bus and configured to receive the DC power from the DC bus;
an energy storage system configured to be selectively connected to the front-end and DC buses through first and second contactors, respectively; and
a switch control module configured to control operation of the first and second contactors, the switch control module configured to close the second contactor when the power train is operably coupled to the external power source such that the energy storage system is charged and the propulsion system receives the DC power, the switch control module configured to close one of the first contactor or the second contactor when the power train is operably decoupled to the external power source, the energy storage system configured to supply the electrical power to the propulsion system when the vehicle system is operably decoupled to the external power source;
wherein the energy storage system includes a plurality of storage units coupled to one another in a parallel-series arrangement, the storage units being allocated into first and second sets of storage units in which each of the first and second sets is held within a grounded module housing.

21. A method of powering a vehicle system that is configured to receive electrical power from an external power source and that includes an energy storage system, the method comprising:
supplying the electrical power to a converter device through a front-end bus when the vehicle system is operably connected to the external power source, the converter device configured to convert the electrical power to DC power and supply the DC power to a DC bus;
charging an energy storage system that is selectively connected to the DC bus when the vehicle system is operably connected to the external power source while simultaneously powering a propulsion system connected to the DC bus;
determining that the vehicle system is operably decoupled to the external power source; and
supplying electrical power from the energy storage system to one of the front-end bus or the DC bus to power the propulsion system when the vehicle system is operably decoupled to the external power source,
wherein the energy storage system includes an output and the propulsion system includes an input, the electrical power remaining in an untransformed state between the output of the energy storage system and the input of the propulsion system when the electrical power is supplied through a second contactor.

22. The method of claim 21, wherein supplying electrical power from the energy storage system to one of the front-end bus or the DC bus includes closing a first contactor to electrically connect the energy storage system to the front-end bus.

23. The method of claim 21, further comprising increasing or decreasing a voltage of the electrical power that is supplied by the energy storage system to the front-end bus using the converter device.

24. The method of claim 23, wherein a voltage of the electrical power from the energy storage is only converted by the converter device prior to powering the propulsion system.

25. A system comprising:
a power receiver configured to be disposed onboard a vehicle system and to connect with an external source of electric current that is disposed off-board the vehicle system;
a converter device configured to convert the electric current from the power receiver and to supply the electric current that is converted to one or more loads of the vehicle system;
an energy storage system configured to be disposed onboard the vehicle system and to store at least some of the electric current received from the power receiver, wherein the energy storage system and the converter device are configured to be in parallel to each other between the power receiver and the one or more loads of the vehicle system;
a first switch configured to be disposed between the power receiver and the energy storage system; and
a second switch configured to be disposed between the energy storage system and the one or more loads of the vehicle system,
wherein the first switch is configured to open to stop conduction of the electric current received from the external source via the power receiver to the energy storage system while the electric current from the external source continues to be conducted to the converter device via the power receiver, the first switch also configured to close to conduct the electric current received from the external source via the power receiver to the energy storage system.

26. The system of claim 25, wherein the second switch is configured to open to stop conduction of the electric current from the energy storage system to the one or more loads of the vehicle system and is configured to close to conduct the at least some of the electric current received by the energy storage system from the power receiver and stored in the energy storage system.

* * * * *